(12) United States Patent
Weston et al.

(10) Patent No.: US 12,263,438 B2
(45) Date of Patent: Apr. 1, 2025

(54) ADVANTAGED ADSORPTION CONTACTORS

(71) Applicants: ExxonMobil Technology and Engineering Company, Annandale, NJ (US); GEORGIA TECH RESEARCH CORPORATION, Atlanta, GA (US)

(72) Inventors: Simon C. Weston, Annandale, NJ (US); Ryan P. Lively, Atlanta, GA (US); Matthew J. Realff, Atlanta, GA (US); William J. Koros, Atlanta, GA (US); Wenying Quan, Marietta, GA (US); Fengyi Zhang, Bartlesville, OK (US); Dong Hwi Jeong, Ulsan (KR); Seongbin Ga, Busan (KR); Stephen J. A. DeWitt, Boston, MA (US); Yang Liu, Belmont, MA (US); Hannah E. Holmes, Atlanta, GA (US)

(73) Assignees: ExxonMobil Technology and Engineering Company, Annandale, NJ (US); Georgia Tech Research Corporation, Atlanta, GA (US)

( * ) Notice: Subject to any disclaimer, the term of this patent is extended or adjusted under 35 U.S.C. 154(b) by 340 days.

(21) Appl. No.: 17/749,573

(22) Filed: May 20, 2022

(65) Prior Publication Data
US 2022/0370950 A1      Nov. 24, 2022

Related U.S. Application Data

(60) Provisional application No. 63/191,640, filed on May 21, 2021.

(51) Int. Cl.
*B01D 53/04*   (2006.01)
*F28D 7/00*    (2006.01)
*F28D 21/00*   (2006.01)

(52) U.S. Cl.
CPC ..... *B01D 53/0438* (2013.01); *B01D 53/0446* (2013.01); *F28D 7/00* (2013.01);
(Continued)

(58) Field of Classification Search
CPC .......... B01D 53/04; B01D 53/0438; B01D 53/0446; B01D 2253/102;
(Continued)

(56) References Cited

U.S. PATENT DOCUMENTS 5,303,547 A * 4/1994 Mieville ............... F01N 3/0878
                                                         95/143
6,645,271 B2 * 11/2003 Seguin ............... B01J 20/28057
                                                         95/146
(Continued)

FOREIGN PATENT DOCUMENTS

CN           104540584 B      6/2016

OTHER PUBLICATIONS

International Preliminary Report on Patentability in related PCT Application No. PCT/US22/30243, mailed Nov. 21, 2023.
(Continued)

*Primary Examiner* — Frank M Lawrence, Jr.
(74) *Attorney, Agent, or Firm* — Troutman Pepper Locke LLP; John Morrissett; Scott Bergeson

(57) ABSTRACT

Contactor structures are provided that can allow for improved heat management while reducing or minimizing the potential for contamination of process gas streams with heat transfer fluids. The contactor structures can include one or more sets of flow channels for process gas flows, such as gas flows introduced to allow adsorption of components from a gas stream or gas flows introduced to facilitate desorption of previously adsorbed components into a purge gas stream. The process gas flow channels can correspond to flow channels defined by a structural material of unitary
(Continued)

structure. The unitary structure can correspond to the entire contactor, or the unitary structure can correspond to a monolith that forms a portion of the contactor. The contactor structures can also include one or more sets of flow channels for heat transfer fluids. The heat transfer flow channels can also be defined by the structural material of a unitary structure.

20 Claims, 8 Drawing Sheets

(52) U.S. Cl.
CPC .. *B01D 2253/108* (2013.01); *B01D 2253/202* (2013.01); *B01D 2253/204* (2013.01); *B01D 2253/25* (2013.01); *B01D 2253/342* (2013.01); *B01D 2257/504* (2013.01); *F28D 2021/0022* (2013.01)

(58) Field of Classification Search
CPC ........ B01D 2253/202; B01D 2253/204; B01D 2253/25; B01D 2253/342; B01D 2257/504; F28D 7/00; F28D 2021/0022; F28F 7/02; F28F 21/06; B33Y 80/00; Y02C 20/40

USPC .................. 96/108, 121, 126, 130, 146, 154
See application file for complete search history.

(56) References Cited

U.S. PATENT DOCUMENTS

| | | |
|---|---|---|
| 6,746,515 B2 | 6/2004 | Wegeng et al. |
| 6,824,592 B2 * | 11/2004 | Monzyk ............ B01D 53/0462 96/4 |
| 7,704,305 B2 * | 4/2010 | Nishida .................. B01J 20/267 62/271 |
| 8,133,308 B2 | 3/2012 | Lively et al. |
| 8,673,059 B2 | 3/2014 | Leta et al. |
| 8,784,534 B2 | 7/2014 | Kamakoti et al. |
| 8,858,683 B2 | 10/2014 | Deckman |
| 9,011,583 B2 | 4/2015 | Halder et al. |
| 2016/0361680 A1 | 12/2016 | Elliott et al. |
| 2017/0080376 A1 | 3/2017 | Jakobsson et al. |
| 2022/0008866 A1* | 1/2022 | Zaffetti .................. B33Y 10/00 |

OTHER PUBLICATIONS

International Search Report in related PCT Application No. PCT/US22/30243, mailed Aug. 17, 2022.

* cited by examiner

ADVANTAGED ADSORPTION CONTACTORS

CROSS-REFERENCE TO RELATED APPLICATIONS

This application is a non-provisional of, and claims priority under 35 U.S.C. § 119 to, U.S. Provisional Patent Application No. 63/191,640, filed May 21, 2021, the entire contents of which are fully incorporated herein by reference.

FIELD

Adsorption contactors with integrated management of heat transfer fluids are provided, along with methods for making such contactors.

BACKGROUND

Mitigation of $CO_2$ emissions and/or concentrations from various types of $CO_2$ sources (industrial, small-scale, and direct air capture) is an area of ongoing interest. One type of strategy for mitigation of $CO_2$ emissions is to use an adsorbent or absorbent to remove $CO_2$ from a potential emission gas flow, and then desorb the $CO_2$ as part of a stream that can be processed to reduce, minimize, or eliminate the release of $CO_2$ into the atmosphere.

U.S. Pat. Nos. 8,784,534 and 8,858,683 describe examples of methods for adsorption of components from a gas phase stream using a swing adsorption process. Generally, combinations of changes in temperature and pressure can be used for cycling between adsorption/absorption of components from a first process gas stream, and then desorbing the adsorbed components into a purge gas stream. The adsorbed component(s) of interest can then be separated from the purge gas stream.

While swing temperature and/or pressure variations can generally be effective for implementing a sorption/desorption cycle, there are a variety of practical problems that have to be resolved in order to perform $CO_2$ sorption/desorption on a commercial scale. Some difficulties are related to selecting an adsorbent or absorbent that can selectively remove $CO_2$ from a gas stream and then release the sorbed $CO_2$ into a second fluid stream. Other difficulties can be related to engineering problems that arise when trying to perform $CO_2$ removal on a larger scale. For example, some challenges for using adsorption or absorption for $CO_2$ removal can be related to reducing or minimizing the volume of an adsorbent/absorbent structure that is required to allow a $CO_2$-containing gas flow to come into contact with a large number of adsorption sites. When the volume of an adsorbent/absorbent structure is large, the equipment footprint required for a sorbent module can grow rapidly, and energy costs for operating the sorbent module can also scale accordingly. Other challenges can be related to managing temperature within the adsorbent/absorbent structure during a sorption/desorption cycle. This can include avoiding contamination of process streams within the sorbent module by any heat transfer fluids within such a module. Still other challenges can be related to managing the flows into and out of a sorbent module, such as avoiding excessive pressure drops and reducing or minimizing the difficulty of introducing a fluid flow into the full volume of the sorbent module.

Conventionally, contactors can be used for a variety of applications, including catalytic applications and sorbent/desorbent applications. One type of conventional contactor structure is a packed bed. In this type of configuration, the packed bed can be composed of particles (such as particles of catalyst or adsorbent/absorbent). Optionally, inert particles or other types of particles can be mixed into the bed to control the density of catalyst or sorbent. A process fluid (typically a gas) is then passed through the packed bed. Packed beds can be effective structures for providing a high density of catalytic or adsorbent/absorbent sites within a given volume. The lack of direct flow channels, however, can also result in pressure drops across a packed bed that are relatively large compared with the rate of gas flow.

Another type of conventional contact structure is a monolith. A monolith structure typically includes a plurality of channels, with process gases passing through the channels. The surfaces of the channels can be coated with a catalyst or sorbent. One difficulty with a monolith structure is the amount of sites that are available for contact with a process gas, as the amount of sites often corresponds only to the number of sites that can be coated on the interior surfaces of the channels. In catalytic applications, where catalyst sites are used only temporarily to catalyze a reaction, this is of lower concern.

An additional consideration for the contactor structure is temperature management. For some adsorbent/absorbent applications, it can be beneficial to either cool the contactor or perform both heating and cooling. Cooling (or both heating and cooling) can be achieved using a heat transfer fluid. Conventionally, however, it is often desirable to avoid mixing of the heat transfer fluid with the process gases being processed using the contactor. Maintaining separate flows of process gas and heat transfer fluid while still retaining the advantages of a given type of contactor structure presents a variety of difficult engineering challenges.

What is needed are sorbent contactors that can provide a high density of sorption/desorption sites in a commercial scale module while also reducing or minimizing heat management difficulties and/or while reducing or minimizing difficulties with managing fluid flow within the module.

U.S. Pat. No. 8,133,308 describes sorbent fiber compositions that can be used in a temperature swing adsorption process. Arrangement of a plurality of sorbent fibers in an apparatus is also described. The sorbent fibers correspond to a polymer matrix with adsorbents supported in the polymer matrix. A central lumen of the fiber is sealed off from the polymer matrix by a barrier layer. In some aspects, a plurality of the sorbent fibers can be arranged in an apparatus for adsorption of a component (such as $CO_2$) from a gas phase flow. In such aspects, a plurality of fibers are included within a vessel. Process gas can be passed into the vessel through slots in the exterior of the vessel in a cross-flow manner. After adsorption of a desired component, the remainder of the process gas can enter a central channel for exhaust from the vessel. A header at the end of the vessel can be used to pass a heat transfer fluid through the central lumens of one or more of the fibers, so that process gas does not mix with heat transfer fluid. It is noted that the flow path for process gas is defined at least in part by the shape of the vessel that is used to contain the plurality of fibers, as the vessel walls provide at least part of the containment that forces the process gas to flow toward the central exhaust channel of the vessel.

U.S. Pat. No. 8,673,059 describes temperature swing adsorption contactors for gas separation. The contactors include a support material that can correspond to either a sorbent material or serve as a support for a sorbent material. The contactors further include microtubes, supported on or between layers of the support material. The microtubes can carry heat transfer fluid for temperature management.

U.S. Pat. No. 9,011,583 describes a monolith type structure containing a plurality of fluid flow channels. The monolith can be used as part of the adsorbent contactor. During operation, a separate cap or top structure can be placed on top of the monolith to block entry of process gas to selected channels. The selected channels can then be used for transport of a heat transfer fluid during operation. The top structure also assists with defining a header for introducing the heat transfer fluid into the selected channels in the monolith without introducing the heat transfer fluid into the channels containing the process gas flow. This can be achieved in part by removing walls from some of the selected channels, so that the selected channels are in fluid communication in the header area defined by the combination of the monolith and the top structure. The selected channels can also include a coating to prevent heat transfer fluid from leaving the selected channels.

U.S. Pat. No. 6,746,515 describes adsorption systems that can be constructed in a modular manner. The modular adsorption systems correspond to a plurality of layers that are constructed to allow heat transfer fluid layers to be arranged above and/or below layers of adsorbent. The modular adsorption systems can be constructed using shims, so that desired materials can be selected for each type of layer in the modular system.

SUMMARY

In an aspect, an adsorption module is provided. The adsorption module includes a first plurality of process gas flow channels defined by a structural material of a unitary structure, the structural material including at least one adsorbent component. The adsorption module further includes a second plurality of heat transfer fluid flow channels defined by the structural material of the unitary structure. The adsorption module further includes one or more process gas inlet headers in fluid communication with the process gas flow channels. The adsorption module further includes one or more heat transfer fluid inlet headers in fluid communication with the heat transfer fluid flow channels. In various aspects, at least one of the one or more process gas inlet headers and the one or more heat transfer fluid inlet headers is defined by the structural material of the unitary structure. Thus, at least one process gas inlet header can be defined by the structural material, or at least one heat transfer fluid inlet header can be defined by the structural material, or at least one of both can be defined by the structural material. Additionally, the adsorption module includes at least one outlet header in fluid communication with the process gas flow channels or the heat transfer fluid channels.

In another aspect, an adsorption module is provided. The adsorption module includes a monolith including a first plurality of process gas flow channels and a second plurality of heat transfer fluid flow channels. The adsorption module further includes an outer shell having a first outer shell piece and a second outer shell piece, the first outer shell piece being a unitary structure comprising a polymeric structural material, the first outer shell piece including a process gas inlet header, the monolith at least partially residing within a volume defined by the first outer shell piece and the second outer shell piece, the first plurality of process gas flow channels being in fluid communication with the process gas inlet header. Additionally, the adsorption module includes at least one outlet header in fluid communication with the process gas flow channels or the heat transfer fluid channels.

In still another aspect, a method for forming a barrier layer inside flow channels of an adsorption contactor is provided. The method includes providing a unitary structure including a first set of flow channels in fluid communication with one or more first contactor inlets and one or more first contactor outlets, and a second set of flow channels in fluid communication with one or more second contactor inlets and one or more second contactor outlets, the first set of flow channels and the second set of flow channels being defined by a structural material of a unitary structure, the structural material comprising a polymeric material. The method further includes passing a solution including a polymer barrier component into the first set of flow channels. The method further includes flowing a purge stream through the first set of flow channels to form a barrier layer at surfaces of the first set of flow channels. Additionally, the method includes lowering a pressure in the second set of flow channels, during at least one of the passing of the solution into the first set of flow channels and the flowing of the purge stream through the first set of flow channels, to a pressure at least 5 kPa-a below the lower of i) an average pressure at the one or more first contactor inlets, or ii) an average pressure at the one or more first contactor outlets.

DETAILED DESCRIPTION

Figure 1:
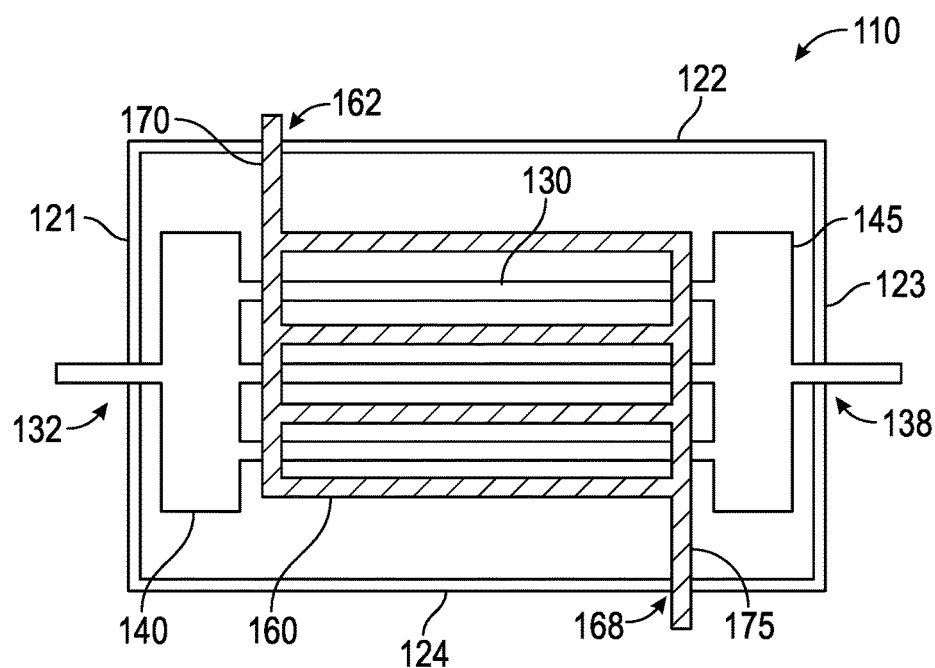
FIG. 1 schematically shows an example of a configuration for flow channels in an adsorption contactor.

All numerical values within the detailed description and the claims herein are modified by "about" or "approximately" the indicated value, and take into account experimental error and variations that would be expected by a person having ordinary skill in the art.

Overview

In various aspects, contactor structures are provided that can allow for improved heat management during sorption/desorption cycles while reducing or minimizing the potential for contamination of process gas streams with heat transfer fluids. The contactor structures can include one or more sets of flow channels for process gas flows, such as gas flows introduced to allow adsorption of components from a gas stream or gas flows introduced to facilitate desorption of previously adsorbed components into a purge gas stream. The process gas flow channels can correspond to flow channels defined by a structural material of unitary structure.

This is in contrast to simply having open spaces defined by various structures in the contactor (such as open spaces between a plurality of hollow fibers), or in contrast to having an adsorbent that corresponds to a generally porous structure that a fluid is passed through. The unitary structure can correspond to the entire contactor, or the unitary structure can correspond to a monolith that forms a portion of the contactor. Optionally, the structural material can correspond to a porous material so that process gases can pass from the process gas flow channels into the bulk structural material to at least a limited degree. The contactor structures can also include one or more sets of flow channels for heat transfer fluids. The heat transfer flow channels can also be defined by the structural material of a unitary structure.

In various aspects, the orientations of the process gas flow channels and the heat transfer fluid flow channels can be selected to increase or maximize the thermal interaction of the various types of flow channels. For example, the average direction of flow for the process gas flow channels and the heat transfer flow channels can be substantially aligned for at least a portion of the flow path of the process gas flow channels in the unitary structure, such as being substantially parallel within a central volume in the contactor structure. This substantial alignment of the process gas flow channels and the heat transfer fluid flow channels can be accomplished while reducing or minimizing the potential for intrusion of heat transfer fluid into the process gas flow channels. As an example, in some aspects, after forming the heat transfer fluid flow channels, a barrier layer can be added to the heat transfer fluid flow channels to reduce or minimize the potential for mixing of heat transfer fluid with process fluid.

Additionally or alternately, in some aspects the size of the process gas flow channels can be varied within the contactor structure. It has been unexpectedly discovered that increasing the size of the process gas flow channels in a downstream portion of the channels can provide increase the volume of process gas that can be processed prior to substantial breakthrough of the component being adsorbed in the contactor structure. Without being bound by any particular theory, it is conventionally believed that increasing the size of the process gas flow channels would reduce the breakthrough time, as increasing the channel size results in a decrease in the ratio of surface area to volume for the flow channel. However, for porous channel structures with adsorbent distributed throughout the structural material, as described herein, it has been discovered that increasing the process gas flow channel size in downstream portions of the flow channel size can increase the processing time prior to breakthrough for a given flow rate of process gas.

In some aspects, the contactor can correspond to a unitary structure. In such aspects, the unitary structure can be formed from a structural material. The structural material of the unitary structure can define the process gas flow channels, the heat transfer fluid channels, and at least one header. The at least one header defined by the structural material of the unitary structure can be at least one header for the process gas, at least one header for the heat transfer fluid, or headers for both the process gas and the heat transfer fluid can be defined by the structural material. Additionally or alternately, an outlet header for the process gas and/or an outlet header for the heat transfer fluid can be defined by the structural material of the unitary structure.

Having at least one header that is defined by the structural material of a unitary structure can allow for a header to be positioned at a location that is downstream from the beginning of either the process gas flow channels or the heat transfer fluid flow channels. This can assist with keeping the process gas and the heat transfer fluid in separate channels. For example, if an inlet header for the heat transfer fluid is located downstream from the beginning of the process gas channels, that can allow the heat transfer fluid channels to also start at a downstream location. This avoids the need to separately block off the heat transfer fluid channels from receiving process gas, as the heat transfer fluid channels will not begin until after the process gas has already been distributed into the process gas flow channels. Additionally, having a unitary structure means that the structure does not have gaps or seams from joining pieces together that might allow leakage of fluids between separate volumes. A similar benefit can be achieved by having an outlet header that is located upstream from the end of either the process gas flow channels or the heat transfer fluid flow channels. In combination with adding a barrier layer to the heat transfer fluid flow channels, mixing of process gas and heat transfer fluid can be reduced, minimized, or eliminated for substantially the entire path lengths of the respective fluids within the contactor.

Alternatively, the contactor can correspond to a plurality of structures, including at least one monolith and one or more outer shell pieces that at least partially contain the at least one monolith. In this type of configuration, at least one of the one or more outer shell pieces can include an input port for the process gas, an input port for the heat transfer fluid, or both an input port for the process gas and an input port for the heat transfer fluid. When an input port for the process gas and an input port for the heat transfer fluid are part of the same outer shell piece, the ports can be part of the same face or part of different faces of the outer shell piece. Optionally, if the at least one monolith only partially resides within the outer shell pieces, the process gas and/or the heat transfer fluid may be at least partially passed directly into the monolith without passing through an outer shell piece.

In some aspects, when the contactor corresponds to at least one monolith that is at least partially contained within one or more outer pieces, the monolith can correspond to a unitary structure that includes the process gas channels and the heat transfer fluid channels. Optionally, the monolith can further include at least one header and/or at least one output header that is defined by the structural material of the monolith.

Additionally or alternately, when the contactor includes one more outer pieces, an outer piece can include a header that is defined by the structural material of the outer piece. For example, one configuration for a contactor can be to have a monolith (possibly corresponding to a conventional ceramic monolith) that is at least partially contained within a plurality of outer pieces. In such a configuration, one of the outer pieces can include a header composed of a plurality of channels that can match a plurality of channels present in the monolith.

One option for preparing a unitary structure corresponding to a monolith, a contactor, or an outer shell piece as described herein is using additive manufacturing, which can also be referred to as 3-dimensional (3D) printing. The ink for the 3D printing can correspond to a solution containing a polymer. After removal of the solvent, the resulting polymeric structural material can correspond to a porous structural material. In some aspects, the polymeric structural material can act as an adsorbent. Optionally, a separate adsorbent can be included in the ink to enhance the adsorption properties of the resulting polymeric structural material.

It is noted that under the definitions provided herein, some unitary structures may fall within the definitions for both a contactor and a monolith. This can occur when a unitary structure includes all of the features for a contactor as described herein, but is also at least partially enclosed within one or more outer pieces, where at least one of the process gas and the heat transfer fluid needs to pass through a port or opening in the an outer piece in order to enter the unitary structure. It is further noted that under the definitions provided herein, if all of the process gas and all of the heat transfer fluid are passed directly into a unitary structure, such a unitary structure is defined herein as a contactor and not a monolith, even if such a contactor partially resides within other structural pieces that the process gas and heat transfer fluid do not pass through.

Definitions

In this discussion, a unitary structure formed from a structural material is defined as a structure where any two locations on the surface of the structural material or within the structural material can be connected by a curve that does not pass through a seam, gap, or other discontinuity in the structural material. The curve does not need to be a straight line, so the curve can pass around channels, headers, or other fluid passages/openings defined by the structural material of the unitary structure. This is in contrast to, for example, a structure formed by two pieces that are then physically attached, such as by screws, rivets, or welds that involve a material different from the structural material. This is also in contrast to structures where one piece of the structure may be inserted into another piece of the structure, with the relative positions of the pieces maintained by tabs, friction fit, or another mechanical/physical means. In some aspects, a contactor can correspond to a unitary structure. In other aspects, a monolith within a contactor can correspond to a unitary structure.

In this discussion, unrestricted flow is defined as flow through an open volume within a structure, where the open volume provides a cross-sectional area for flow of 0.3 mm or greater throughout the flow path. It is noted that an unrestricted flow path can result in pressure drop for a fluid flowing along the unrestricted flow path, due to features such as curves in the flow path or turbulence in the flow path. Unrestricted flow is in contrast to restricted flow, which corresponds to various types of flows such as flow through a packed bed, diffusion through a porous material, or permeation through a membrane.

In this discussion, a volume within a unitary structure that is "defined by the structural material" is defined herein as a volume where the unrestricted flow path for fluid in the volume is defined by the structural material. For example, one type of volume that can be defined by a structural material is a flow channel, such as a process gas channel or heat transfer fluid channel. For a flow channel, the unrestricted flow path corresponds to a path from the initial opening of the flow channel on one face of the structure to an exit for the flow channel. The structural material of a unitary structure defines such a flow channel if the wall(s) of the flow channel are defined by the structural material. As defined herein, diffusion of fluid through a material corresponds to restricted flow, and therefore a porous material can be used to define the unrestricted flow path for a flow channel. Additionally, to the degree that a barrier material is used to coat the walls of a porous structure material in a flow channel, under the definitions provided herein, such a coated flow channel is still defined by the structural material, unless the coating materials substantially modifies the cross-sectional shape of the flow channel.

As another example, a header within a unitary structure is defined by the structural material of the unitary structure if all of the surfaces in the header correspond to the structural material. This is in contrast to a situation where the volume of a header is defined as a volume between two separate pieces that are brought together, so that at least one interior surface of the header is a surface of a first piece and at least a second interior surface of the header is a surface of a second piece.

In this discussion, the cross-sectional area at a given location in a flow channel is defined as the minimum cross-sectional area that can be achieved by passing a plane through the flow channel at a given location. In this discussion, the average cross-sectional area for a single flow channel can be defined for a portion of the flow channel located between any two parallel planes. The average cross-sectional area for a plurality of flow channels is defined as the average of the average cross-sectional areas for the portions of the plurality of flow channels that are between any two parallel planes.

In this discussion, sorption is defined as including both adsorption and absorption. Adsorption refers to physical association of a component with a surface or active site, such as physisorption of $CO_2$ on a solid surface. Absorption corresponds to a physical or chemical incorporation of component into a different phase, such as incorporation of gas phase $CO_2$ into a complex with a liquid phase amine Desorption is defined as separation of an adsorbed or absorbed component from the adsorption surface or absorption phase.

In this discussion, surface areas of polymeric materials are defined as BET (Brunauer, Emmett, and Teller) surface areas as measured according to ASTM D3663. In this discussion, pore volumes can be determined according to ASTM D4641 ($N_2$ pore volume) or ASTM D4284 (Hg pore volume).

In this discussion, a zeotype is defined to refer to a crystalline material having a porous framework structure built from tetrahedra atoms connected by bridging oxygen atoms. Examples of known zeotype frameworks are given in the "Atlas of Zeolite Frameworks" published on behalf of the Structure Commission of the International Zeolite Association", $6^{th}$ revised edition, Ch. Baerlocher, L. B. McCusker, D. H. Olson, eds., Elsevier, New York (2007) and the corresponding web site, http://www.iza-structure.org/databases/. Under this definition, a zeolite refers specifically to an aluminosilicate having a zeotype framework structure. Under this definition, a zeotype can refer to aluminosilicates (i.e., zeolites) having a zeotype framework structure as well as crystalline structures containing oxides of heteroatoms different from silicon and aluminum. Such heteroatoms can include any heteroatom generally known to be suitable for inclusion in a zeotype framework, such as gallium, boron, germanium, phosphorus, zinc, and/or other transition metals that can substitute for silicon and/or aluminum in a zeotype framework. It is noted that under this definition, a zeotype can include materials such as silicoaluminophosphate (SAPO) materials or aluminophosphate (AlPO) materials.

Examples of Contactor Structures

FIG. 1 schematically shows an example of a configuration for flow channels in an adsorbent contactor. In FIG. 1, flow channels 130 correspond to flow channels for a process gas flow. It is noted that three process gas flow channels 130 are shown in FIG. 1, but any convenient number can be included. For convenience, the process gas flow channels 130 are shown as a two-dimensional array, but it is understood that many types of contactor configurations can involve three-dimensional arrays of process gas flow channels. During operation, process gas enters contactor 110 via process gas inlet 132 in face or wall 121 of the contactor 110.

The process gas flows into a process gas inlet header 140. The gas is then distributed into process gas flow channels 130. In the example configuration shown in FIG. 1, the process gas flow channels exit into a process gas outlet header 145. The combined process gas exhaust then exits from the contactor via process gas outlet 138 in a different wall or face 123 of the contactor. It is noted that a plurality of process gas inlets 132 can be used and/or a plurality of process gas outlets 138 can be used if desired. Similarly, process gas inlet header 140 can correspond to a plurality of headers and/or process gas outlet header 145 can correspond to a plurality of manifolds.

Flow channels 160 correspond to flow channels for heat transfer fluid. It is noted that four heat transfer fluid flow channels 160 are shown in FIG. 1, but any convenient number can be included. For convenience, the heat transfer fluid flow channels 160 are shown as a two-dimensional array, but it is understood that many types of contactor configurations can involve three-dimensional arrays of heat transfer fluid flow channels. In the example configuration shown in FIG. 1, heat transfer fluid inlet 162 enters contactor 110 on a second face 122 of contactor 110 that is orthogonal to the direction of flow for process gas flow channels 130. In other configurations, heat transfer fluid inlet 162 can be located on the same wall or face as the process gas inlet 132 and/or heat transfer fluid inlet 162 can be located on a face that is at an angle other than perpendicular. A heat transfer fluid inlet header 170 can be used to distribute heat transfer fluid into heat transfer flow channels 160. In the example configuration shown in FIG. 1, the heat transfer fluid flow channels exit into a heat transfer fluid outlet header 175. The combined heat transfer fluid exhaust then exits from the contactor via heat transfer fluid outlet 168 in a different wall or face 124. It is noted that a plurality of heat transfer fluid inlets 162 can be used and/or a plurality of heat transfer fluid outlets 168 can be used if desired. Similarly, heat transfer fluid inlet header 170 can correspond to a plurality of headers and/or heat transfer fluid outlet header 175 can correspond to a plurality of manifolds. It is noted that heat transfer fluid header 170 is shown as a conduit with a plurality of heat transfer flow channels 160 branching off from the conduit. In other aspects, heat transfer fluid header 170 can correspond to a larger header volume, such as the larger header volume shown for process gas header 140.

In the example configuration shown in FIG. 1, the process gas flow channels 130 and the heat transfer fluid channels 160 are substantially parallel for a majority of the flow path length of the process gas flow channels. As explained in more detail below, in various aspects, within a central volume for the contactor, the average direction of flow within the process gas flow channels 130 can differ from the average direction of flow within the heat transfer flow channels 160 by 30° or less, or 20° or less, or 10° or less.

It is noted that the process gas flow channels 130 and the heat transfer fluid flow channels 160 are represented in FIG. 1 as channels that are substantially straight and that are of substantially constant size. In other aspects, any convenient type of flow path can be used. Additionally or alternately, the size of the flow channels can be varied in any convenient manner.

Figure 2:
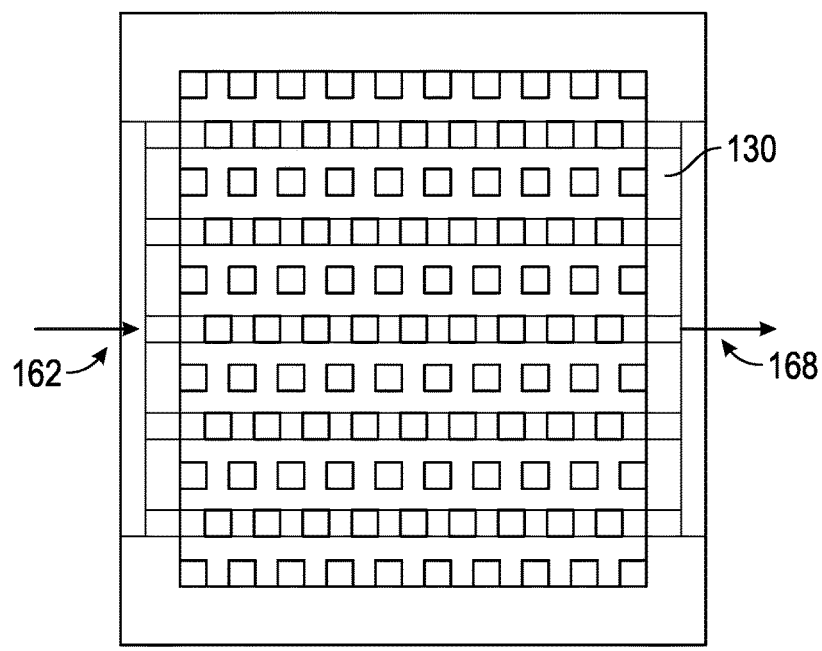
FIG. 2 shows a cross-sectional view starting in the plane defined by the interface of the process flow channels with the process gas inlet header for a contactor having a flow channel configuration according to FIG. 1.

FIG. 2 shows a cross-sectional view of the interior of the process gas flow channels 130 at the location where the process gas flow inlet header 140 interfaces with the process gas flow channels 130. The cross-sectional view in FIG. 2 is perpendicular to the entry and exit flows for the heat transfer fluid, as indicated by the locations of heat transfer fluid inlet 162 and heat transfer fluid outlet 168. Since the heat transfer fluid header 170 in FIG. 1 is located downstream relative to process gas inlet header 140 in FIG. 1, in the cross-sectional view shown in FIG. 2, all of the gas flow channel openings correspond to process gas flow channels 130.

Figure 3:
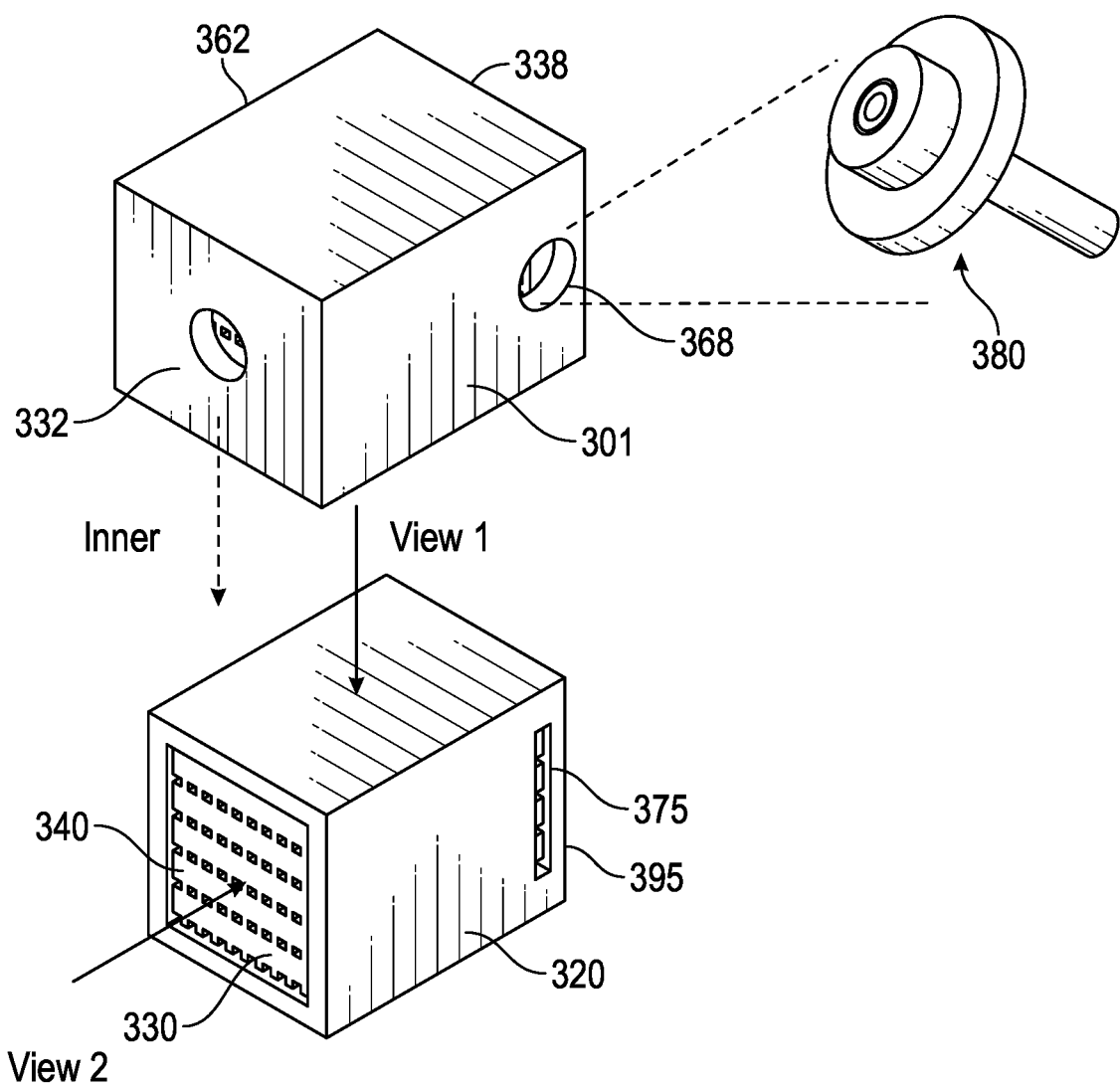
FIG. 3 shows a perspective view of a contactor configuration including a unitary structure for the contactor.

FIG. 3 shows a perspective view of an example of a contactor structure that can implement the type of configuration shown in FIGS. 1 and 2. In FIG. 3, a contactor outer shell 301 (top portion of figure) and a corresponding inner monolith 320 (bottom portion of figure) are shown as separate structures in order to illustrate the structures. However, it is understood that the outer shell 301 and inner monolith 320 can be formed as a unitary structure, such as by using 3D printing to form the unitary structure. In still other aspects where the contactor is not a unitary structure, outer shell 301 can be formed using a plurality of outer shell pieces (not shown), so that one or more monoliths 320 can be inserted into outer shell 301.

In FIG. 3, outer shell 301 includes several openings. Process gas inlet 332 and heat transfer fluid outlet 368 are shown in FIG. 3. Process gas inlet 332 provides fluid communication between an exterior input flow and process gas inlet header 340. The process gas inlet header 340 corresponds to a volume between inner monolith 320 and outer shell 301. The process gas inlet header 340 allows process gas to be distributed to the plurality of process gas flow channels 330. In the example shown in FIG. 3, the contactor includes two types of headers related to exit of heat transfer fluid. A first group of heat transfer fluid headers 375 represent heat transfer fluid headers within the monolith portion 320 of the contactor structure. The heat transfer fluid headers 375 transport heat transfer fluid perpendicular to the direction of flow for the process gas flow channels, so that that the heat transfer fluid flow can be substantially parallel to the process gas flow within the monolith while still exiting from the contactor along a direction that is perpendicular to the flow. A second heat transfer fluid header 395 corresponds to another volume between inner monolith 320 and outer shell 301. The second heat transfer fluid outlet header 395 allows heat transfer fluid exiting from the first group of heat transfer fluid headers 375 to be collected in a common volume for exhaust via exterior heat transfer fluid exhaust conduit 380.

In addition to process gas inlet 332 and heat transfer fluid outlet 368, a process gas outlet 338 and a heat transfer fluid inlet 362 are also included in outer shell 301, although these openings are not visible in the perspective view provided in FIG. 3. Process gas outlet 338 allows for fluid communication between the exit of process gas flow channels 330 and an exterior process gas exhaust conduit, via a process gas outlet header (not shown). Heat transfer fluid inlet 362 allows for fluid communication between the beginning of heat transfer fluid flow channels 360 and an exterior heat transfer fluid input conduit, via a heat transfer fluid input header (not shown).

More generally, in aspects where the contactor corresponds to an assembly including at least one monolith that is at least partially contained within one or more outer pieces, one or more headers for the contactor can correspond to a volume defined between an outer piece and a monolith. In such aspects, the volume between the outer piece and the monolith can be in fluid communication with one or more openings in the outer piece and one or more openings in the monolith. It is noted that in aspects where the contactor is a unitary structure, headers that are within the contactor can correspond to headers that are defined by the structural material of the unitary structure.

The configurations shown in FIGS. 1-3 can be formed, for example, using 3D printing to form various unitary structures from a polymeric structural material. Optionally, in some aspects, at least one structure in a contactor can be made by an alternative method, such as using a ceramic monolith that is partially contained within one or more outer shell pieces, with at least one outer shell piece that is formed using 3D printing. Still another option can be to use a monolith formed by 3D printing that is partially contained within one or more outer shell pieces, with at least one outer shell piece being formed by a method other than 3D printing.

Figure 4:
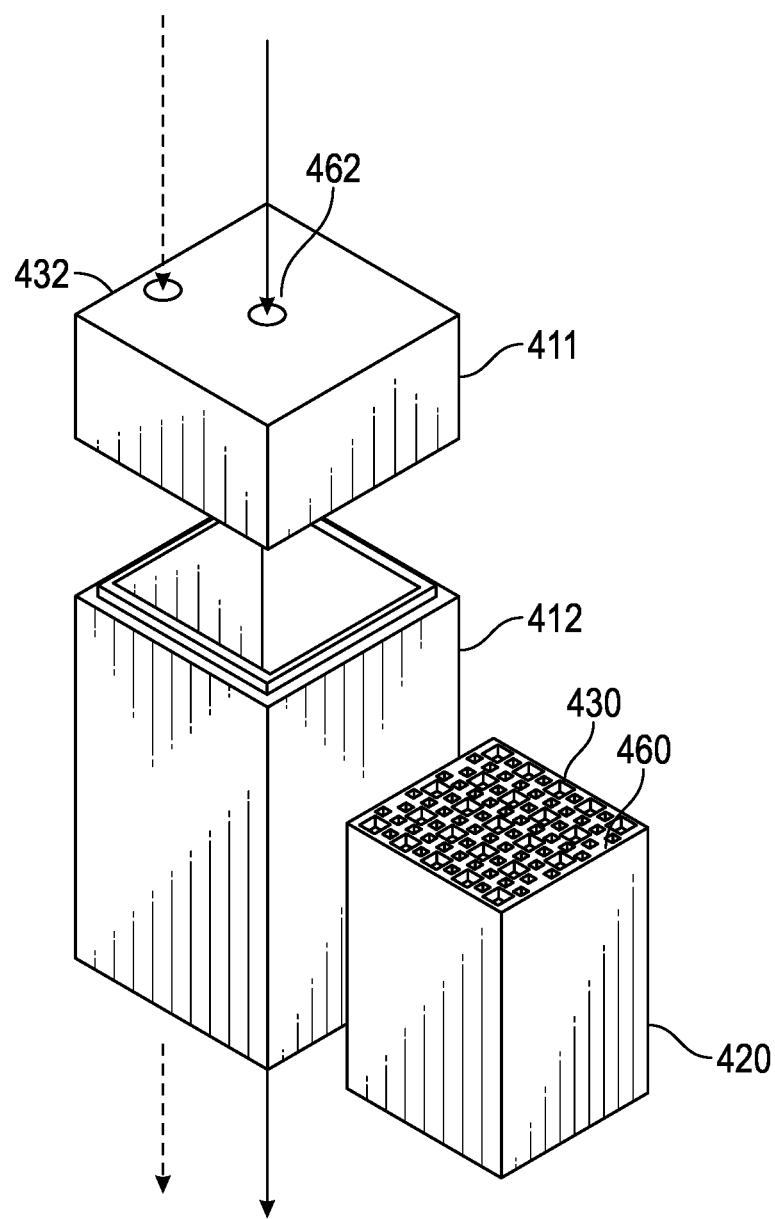
FIG. 4 shows a perspective view of a modular contactor configuration.

FIG. 4 shows an example of another type of contactor configuration. In the example shown in FIG. 4, the contactor is a modular contactor assembly, including one or more monoliths 420 and an outer shell that is composed of two or more outer shell pieces, such as outer shell top 411 and outer shell bottom 412. In FIG. 4, monolith 420 includes a plurality of channels. A first portion of the channels correspond to process gas flow channels 430, while a second portion of the channels correspond to heat transfer fluid flow channels 460. Outer shell top 411 can correspond to a unitary structure that provides a process gas inlet header and a heat transfer fluid inlet header. This can allow process gas inlet 432 to have fluid communication with process gas flow channels 430 and heat transfer fluid inlet 462 to have fluid communication with heat transfer fluid flow channels 460 while avoiding mixing of the respective flows. As described below, mixing can further be reduced, minimized, or eliminated by providing a barrier layer within the heat transfer fluid flow channels 460.

Average Axis of Flow for Flow Channels

In this discussion, an average axis of flow can be defined for the process gas flow channels and for the heat transfer fluid flow channels within a central volume of a contactor. In order to determine the central volume, the following procedure can be used. First, the process gas flow channels are defined as flow channels that connect a process gas flow inlet header with a process gas outlet header. In the event that the process gas inlet corresponds to an edge of the structure, then for purposes of this definition, the edge of the structure is defined as the process gas header. Similarly, if the process gas exits directly from the flow channels to outside the structure, then the edge of the structure is defined as the outlet header. Next, a bounding rectangular box (right angles between height, width, and length dimensions) can be created for the process gas flow channels. The bounding rectangular box is defined as the smallest rectangular box that contains all of the process gas flow channels.

A center point can then be defined for the bounding box for the process gas flow channels. Because the bounding box is a rectangular box, the center point is defined as a point having coordinates of the mid-point of each side of the rectangular box. After defining the center point for the bounding box, a smaller rectangular box having the same center point but roughly half of the volume can be determined. The smaller (roughly half-volume) rectangular box corresponds to a box having the same center point, but with the length of each side being reduced by 20%.

After defining the reduced volume box for the process gas flow channels, a similar procedure can be used to define a reduced volume box based on the heat transfer fluid flow channels. The heat transfer fluid flow channels are defined as flow channels that connect a heat transfer fluid inlet header with a heat transfer fluid outlet header. Based on this, a rectangular bounding box can be defined for the heat transfer fluid flow channels. A center point can then be determined, followed by determining a reduced volume box (i.e., each side length reduced by 20%).

After defining a reduced volume box based on the process gas flow channels, and a reduced volume box based on the heat transfer fluid flow channels, the central volume can be defined. The central volume is defined as the overlapping volume between the two reduced volume boxes.

Figure 9A:
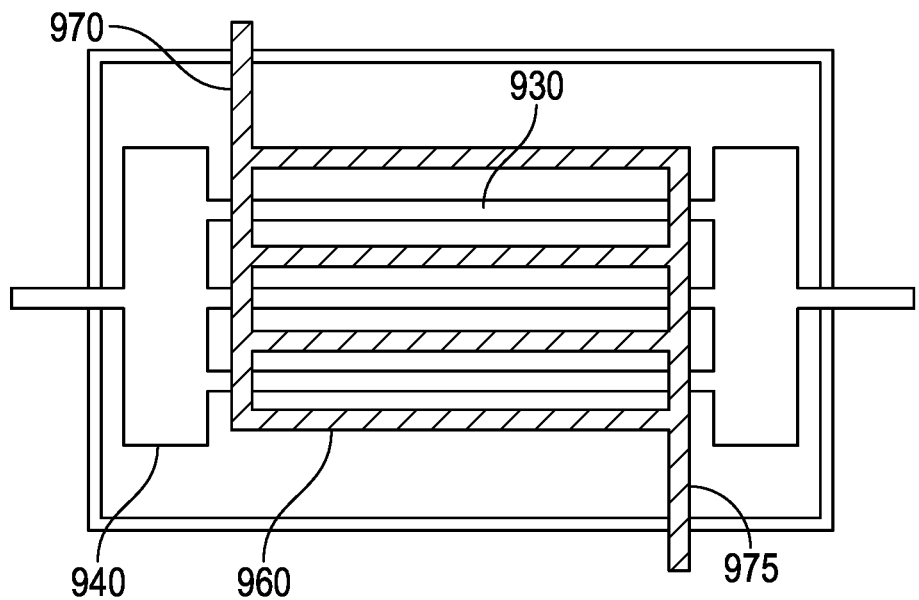
FIGS. 9A-9D illustrate a method for defining a central volume.

FIGS. 9A-9D illustrates the process of identifying a common volume. To simplify the drawing, FIGS. 9A-9D illustrate the process using a 2-dimensional view. In FIG. 9A, a contactor is shown that includes process gas flow channels 930 and heat transfer fluid flow channels 960. The process gas flow channels 930 provide fluid communication between process gas inlet header 940 and process gas outlet header 945. The heat transfer fluid flow channels 960 provide fluid communication between heat transfer fluid inlet header 970 and heat transfer fluid outlet header 975.

Figure 9B:
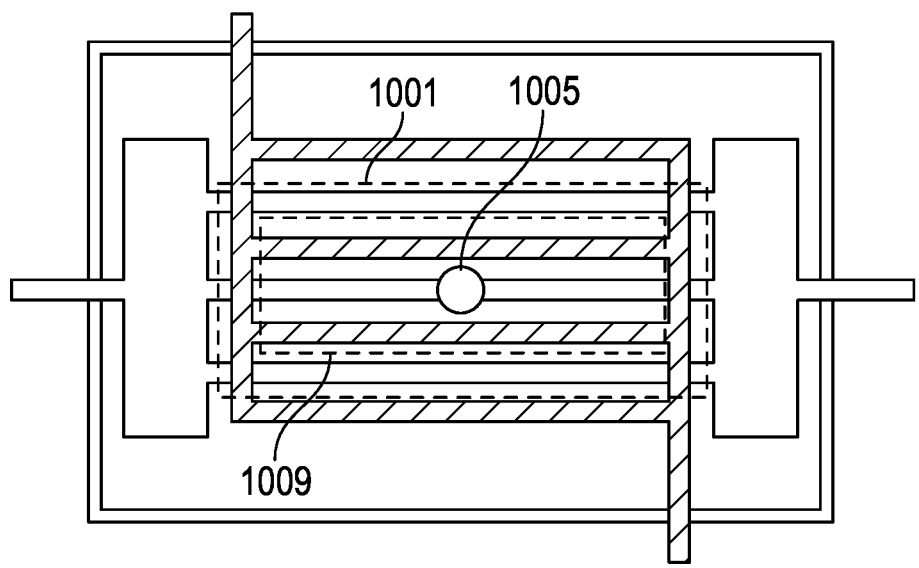

FIG. 9B illustrates the process of building boxes related to the process gas flow channels 930. In FIG. 9B, the process gas flow channels are contained within bounding box 1001. Bounding box 1001 is intended to represent the minimum size rectangular box that contains all of the process gas flow channels. However, in order to allow the bounding box 1001 to be visibly distinguished in the drawing from the flow channels and headers, the edges of bounding box 1001 are slightly offset. The bounding box 1001 has a center point 1005. Reduced volume box 1009 corresponds to a box having the same center point 1005, but with sides that are 20% shorter than bounding box 1001.

Figure 9C:
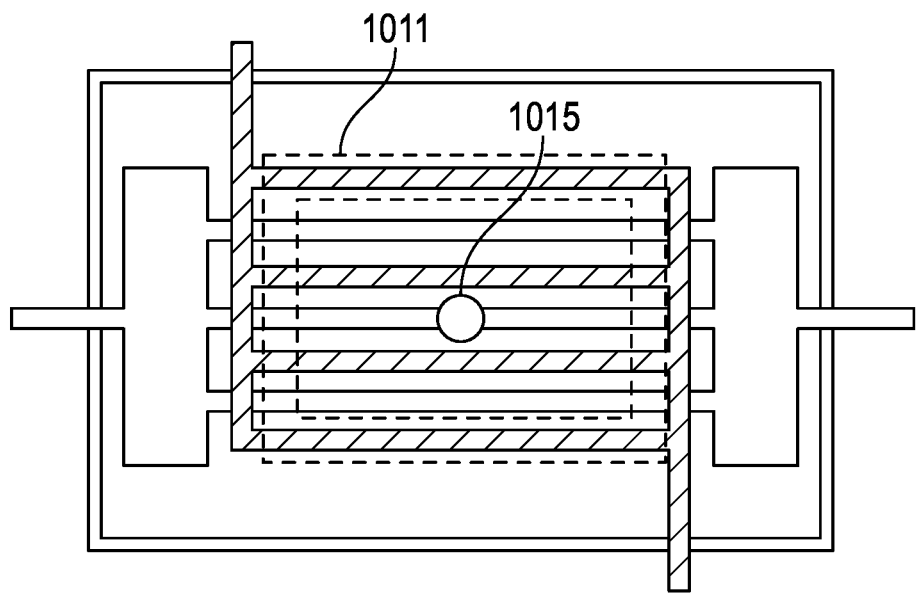

FIG. 9C similarly shows a bounding box 1011 based on the rectangular box that contains the heat transfer fluid flow channels. FIG. 9C also shows the center point 1015 of bounding box 1011, and a reduced volume box 1019 having the same center point 1015.

Figure 9D:
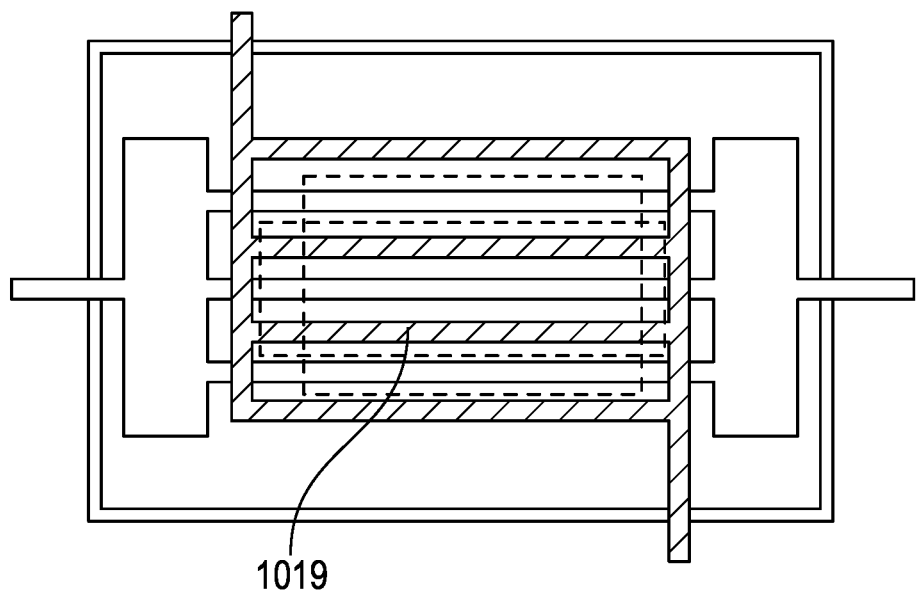

FIG. 9D shows the overlap 1025 between box 1009 and box 1019. The overlap volume 1025 corresponds to the central volume for the contactor shown in FIGS. 9A-9D.

Once the central volume has been determined, the average axis of flow for the different types of flow channels within the central volume can be determined. To determine an average axis of flow for the process gas flow channels, an axis of flow is determined for any portions of a process gas flow channel that reside within the central volume. For most flow channels, the channel will enter the central volume once and exit from the central volume once. It is noted that if a single process gas flow channel enters the central volume more than 3 times or exits more than 3 times, that process gas flow channel is excluded from consideration.

For each process gas flow channel within the central volume, the axis of flow for the flow channel is a straight line vector corresponding to the average direction of flow for a fluid within the flow channel. This straight line vector corresponds to a straight line that minimizes the least-squares distance from the straight line vector to the mid-point line for the process gas flow channel. The mid-point line for a flow channel corresponds to a line that passes through the geometric center of the flow channel along the flow path. Of course, for a flow channel that is straight, the axis of flow will simply correspond to the mid-point line for the flow channel. As another example, a helical flow channel will have an average direction of flow that roughly corresponds to the central axis of the helix. The vector has a start point corresponding to the start point for the corresponding process gas flow channel within the central volume. The end point is the location where the vector comes into contact with another face of the central volume. An average axis of flow can then be determined. The average axis of flows corresponds to a vector that is an average of the vectors for the axis of flow for the individual process gas flow channels in the central volume.

The above procedure can be repeated for the heat transfer fluid flow channels to determine an average axis of flow for the heat transfer fluid flow channels in the central volume.

The average axis of flow for the process gas flow channels and the average axis of flow for the heat transfer fluid channels can then be used to determine an angle between the vectors. This angle represents the difference in direction of flow within the central volume for the process gas flow channels and the heat transfer fluid flow channels. In various aspects, the angle between the average axis of flow for the process gas flow channels and the average axis of flow for the heat transfer fluid channels can be 30° or less, or 20° or less, or 10° or less, such as down to the vectors being substantially aligned or parallel (i.e., 0°).

Structural Material for Unitary Structures

An example of a method for forming a unitary structure is to use additive manufacturing, and in particular solvent-based additive manufacturing (SBAM). In SBAM, an ink for additive manufacturing can be used to form structures based on a polymeric structural material. The ink can include a solvent for the polymeric material, with the structure forming as the solvent is removed from the ink. The ink can optionally also include one or more adsorbents. This can allow polymeric structures to be formed that have adsorbent distributed throughout the structure. In this discussion, "polymeric material" refers to just the polymer portion of a structure, while "structural material" or "polymeric structural material" refers to the polymer plus any additional components (such as adsorbents) that are incorporated into the polymer matrix.

In various aspects, a contactor can correspond to one or more unitary structures composed of a structural material and an adsorbent. In some aspects, the structural material can correspond to a polymeric material that serves as both a structural material and as and adsorbent (or at least partially as an adsorbent). In some aspects, the structural material can correspond to a composite of a polymeric material and a separate adsorbent that is incorporated into the polymeric material. A unitary structure can be formed from a polymeric structural material by any convenient method. In some aspects, a unitary structure can be formed by solvent-based additive manufacturing. An example of a component that can be adsorbed by the polymeric material and/or the adsorbent incorporated into the structural material is $CO_2$.

In some aspects, after forming a structure from a polymeric structural material, the polymeric structural material can have a relatively high surface area to increase the number of potential adsorption sites per volume of the structural material that is exposed to a process gas. For example, in some aspects the polymeric structural material can have a surface area of 50 $m^2/g$ or more, or 100 $m^2/g$ or more, or 200 $m^2/g$ or more, or 500 $m^2/g$ or more, such as up to 3000 $m^2/g$ or possibly still higher.

In some aspects, the structural material can have sufficient porosity so that process gas can diffuse into the polymeric material. This can allow for adsorption throughout various portions (such as up to substantially all) of the volume of structural material that is used for forming a unitary structure. In such aspects, the structural material can have a pore volume (determined by nitrogen physisorption) of 0.3 $cm^3/g$ to 1.3 $cm^3/g$ and/or a pore volume (determined by mercury porosimetry) of 1.0 $cm^3/g$ to 3.0 $cm^3/g$. In other aspects, the structural material can have a relatively low porosity, so that the volume where adsorption can occur primarily corresponds to flow channels and/or other open volumes within a unitary structure that are connected to the flow channels.

A variety of types of polymers can be used as the polymeric material in a structural material. Examples of polymers that can be used as the polymeric material in a polymeric structural material include, but are not limited to, cellulose acetate, polyvinylpyrrolidone, polysulfone, polyethersulfone, epichlorohydrin, a polyether amide block co-polymer, polyimides, polyolefins, polypropylene, polyethylene, polyamides, poly(tetrafluoroethene), polyvinylidene chloride (PVDC), polystyrene, polyisobutylene, polybutadiene, polyurethanes, elastomers, co-polymers thereof, or combinations thereof. Other examples of polymers can include materials corresponding to polymers of intrinsic porosity (PIM). In some aspects, the polymer in the polymeric structural material can include, but is not limited to, cellulose acetate, polyimines (such as Matrimid 5218), polyamide-imides (such as Torlon®), polyether sulfone (PES), derivatives of PIM-1 (such as amidoximated PIM-1), and other polymers with intrinsic steric frustration which effect microporosity.

A variety of adsorbent materials can be used as an adsorbent when a polymeric structural material corresponds to a composite of a polymeric material and an incorporated adsorbent. Some examples of adsorbents can correspond to metal organic framework (MOF) materials, activated charcoal, porous aromatic framework materials, covalent organic framework materials, porous organic polymers, and cage materials, or combinations thereof. Examples of MOF materials include EMM-44, EMM-67, and HKUST-1. Other types of adsorbents can include, but are not limited to, adsorbents having a zeotype framework structure. More generally, any convenient type of particulate adsorbent can be used. Such adsorbents can be incorporated in any convenient manner. For example, when forming a unitary structure by 3D printing, the ink for the 3D printing can include both a polymeric material and nanoparticles of the adsorbent material. Additionally or alternately, adsorbent can be added to the interior surface of the process gas flow channels, such as by using a washcoat to add one or more layers of a coating that contains adsorbent.

In some alternative aspects, one or more structures in a contactor can correspond to structures formed from a structural material different from a polymeric material. For example, in some aspects an outer shell can be formed from a polymeric material while at least one interior monolith can be formed from a structural material corresponding to a ceramic or metallic material. In aspects where the contactor corresponds to a unitary structure, the structural material is preferably a polymeric material and/or a composite of a polymeric material and one or more adsorbents.

In various aspects, an ink composition for forming a polymeric contactor structure that incorporates additional adsorbent particles can include at least at least one solvent, at least one structure forming component (non-solvent and/or pore forming component), a polymeric material dissolved in the solvent, and particles of an adsorbent material dispersed and/or suspended in the solution. In some aspects, the adsorbent particles can correspond to a MOF material, optionally such as a water-sensitive MOF. Additionally or alternately, the adsorbent particles can correspond to a material with a zeotype framework structure, activated carbon, or another type of adsorbent particle.

In various aspects, polymeric ink compositions including substantial quantities of adsorbent materials can be used to form polymeric structures using 3D printing. The polymeric structures are formed by depositing the polymer as a solution in a combination with a solvent and a structure forming component (i.e., a non-solvent and/or a pore forming component), and then using phase inversion as the solvent evaporates to form the polymeric structure.

When performing 3D printing using an ink composition, an ink composition can be selected so that the ink composition corresponds to a homogenous phase, but a targeted amount of solvent evaporation can cause the ink composition to cross the binodal line, resulting in phase inversion. During 3D printing, the ink can be deposited in the presence of an atmosphere containing the solvent, so that solvent evaporation is reduced or minimized until after the ink composition is "printed" on the desired surface. For example, the printing head for depositing the ink can include one or more additional nozzles for dispersing additional solvent as printing occurs, so that the phase inversion does not occur until the ink is deposited on the surface. After deposition or printing of a layer of the ink composition, the solvent can be allowed to evaporate. As the solvent concentration is reduced, the solvent system will eventually become unstable, causing the polymer dissolved in the solvent to precipitate to form a continuous polymer skeleton. The structure forming component and any remaining solvent form a separate phase that can facilitate forming additional pore volume in the polymer structure. The structure forming component and remaining solvent can then be removed by further drying as convenient during the manufacturing process.

In some aspects, ink compositions can be used that include a weight ratio of adsorbent to polymer of 1.0 or more (i.e., a 1 to 1 weight ratio of adsorbent to polymer), or 1.5 or more, or 2.0 or more, or 3.0 or more, such as up to 6.0 or possibly still higher. Additionally or alternately, the ink composition can contain 10 wt % or more of adsorbent relative to a weight of the ink composition, or 15 wt % or more, or 20 wt % or more, such as up to 50 wt % or possibly still higher. Further additionally or alternately, a combined weight of the polymer and the adsorbent in the ink composition can correspond to 25 wt % or more of the weight of the ink composition, or 30 wt % or more, or 40 wt % or more, such as up to 60 wt % or possibly still higher. Still further additionally or alternately, the ink composition can include 7.0 wt % to 15 wt % of polymer relative to a weight of the ink composition, or 10 wt % to 15 wt %, or 12 wt % to 15 wt %. It is noted that the ink composition can include a sufficient amount of polymer so that phase inversion can occur.

In other aspects, an ink composition can include a weight ratio of adsorbent to polymer of 0.3 to 6.0, or 0.5 to 6.0, or 1.0 to 6.0, or 1.5 to 6.0, or 2.0 to 6.0, or 3.0 to 6.0. At lower ratios of adsorbent to polymer, the benefit of incorporating the adsorbent material is reduced, but the difference between such an ink composition and a conventional ternary ink composition is also reduced. In such aspects, the ink composition can contain 3.0 wt % or more of adsorbent relative to a weight of the ink composition, or 5.0 wt % or more, or 10 wt % or more, or 15 wt % or more, or 20 wt % or more, such as up to 50 wt % or possibly still higher.

A variety of metal-organic framework materials can be incorporated into an ink composition for forming structures via 3D printing. Metal-organic frameworks (MOFs) are a relatively new class of porous materials that are comprised of metal ion/oxide secondary building units interconnected by organic linking ligands through covalent bonds. MOFs are characterized by low densities, high internal surface areas, and uniformly sized pores and channels. MOFs are typically crystalline materials. Some types of MOF materi-als can include zeolitic imidazole frameworks (sometimes referred to as "ZIFs"), unconventional MOFs (sometimes referred to as UMOFs), and SIFSIX MOFs.

A variety of MOFs have been characterized as having $CO_2$ adsorption capabilities. For example, Mg-MOF-74 corresponds to a metal organic framework material based on $Mg^{2+}$ ions and 2,5-dihydroxyterephthalic acid. As another example, MOF-274 corresponds to a metal organic framework material based on $Mg^{2+}$ metal ions coordinated with 4,4'-dioxidobiphenyl-3,3'-dicarboxylate. As another example, EMM-67 corresponds to a metal organic framework material based on $Mg^{2+}$ and $Mn^{2+}$ metal ions coordinated with 4,4'-dioxidobiphenyl-3,3'-dicarboxylate. MOF-274 and EMM-67 can be further enhanced by appending functionalities like, diamines, N,N'-dimethylethylenediamine, or 2-aminomethylpiperidine to produce structures such as EMM-44. As still another example, MIL-101(Cr) is a metal organic framework composed of trigonal nodes of 3 chromium and at least 13 oxygen atoms that are bridged by benzene-dicarboxylate linkages in the MTN (IZA code) topology. Yet another example is EMM-42. EMM-42 is a metal organic framework having the same secondary building units as MIL-101(Cr), namely trigonal nodes of 3 chromium atoms, in which some or all of the benzene-dicarboxylate ligands joining adjacent chromium nodes have been exchanged by phenylene-bisphosphonic acid linking ligands. Still another example is HKUST-1, also referred to as MOF-99. The HKUST-1 framework is built up of dimeric metal units, which are connected by benzene-1,3,5-tricarboxylate linker molecules. The paddlewheel unit is the commonly used structural motif to describe the coordination environment of the metal centers and also called secondary building unit (SBU) of the HKUST-1 structure. The paddlewheel is built up of four benzene-1,3,5-tricarboxylate linkers molecules, which bridge two metal centers.

In order to form a polymeric structure during 3D printing, the ink composition can also contain a polymer. Some examples of polymers that can be included in the ink composition are polymers of intrinsic microporosity. Polymers of Intrinsic Microporosity (PIMs) are an emerging material of interest for important gas separations. Spiro centers integrated into the polymer backbone prevent efficient packing and induce microporosity in the polymer. This microporosity can be beneficial for forming contactor structures, as the microporosity can allow process gases flowing through flow channels in a contactor structure to access other portions of the contactor volume.

Other types of porous polymers can also be used to form an ink composition. In some aspects, the polymer in an ink composition can include, but is not limited to, cellulose acetate, polyimines (such as Matrimid 5218), polyamide-imide polymers, polyether sulfone (PES), derivatives of PIM-1 (such as amidoximated PIM-1), and other polymers with intrinsic steric frustration which effect microporosity.

In some aspects, the solvent can correspond to tetrahydrofuran, acetone, and/or N-methyl pyrrolidone. More generally, the solvent can be a solvent that has high solubility for the polymer in the ink composition. There exist many methods for determining level of solubility of the polymer in the volatile solvent compound. For example, in some aspects, the Hildebrand solubility parameters can be determined for the polymer and the volatile solvent compound. In some embodiments, the Hildebrand solubility parameters of the polymer and the volatile solvent compound can have a difference of 3.6 $MPa^{1/2}$ or less. As would be appreciated by one of ordinary skill in the art, such an embodiment would provide a volatile solvent compound which would be able to dissolve the polymer to create a substantially homogeneous solution. Depending on the aspect, potential solvents can include, but are not limited to, acetaldehyde, acetic acid, acetone, acetonitrile, butanediol, butoxyethanol, butyric acid, diethanolamine, diethylenetriamine, dimethyl acetamide (DMAc), dimethylformamide (DMF), dimethoxy ethane, dimethyl sulfoxide (DMSO), dioxane, ethanol, ethylamine, ethylene glycol, formic acid, furfuryl alcohol, glycerol, methanol, methyl diethanolamine, methyl isocyanide, N-methyl-2-pyrrolidone (NMP), propanol, propanediol, propanoic acid, propylene glycol, pyridine, tetrahydrofuran (THF), triethylene glycol, dimethyl hydrazine, hydrazine, hydrofluoric acid, hydrogen peroxide, nitric acid, sulfuric acid, pentane, cyclopentane, hexane, cyclohexane, benzene, toluene, chloroform, diethyl ether, dichloromethane, or a combination thereof.

In aspects where a non-solvent is included in the ink composition as a structure forming component, the non-solvent can be a compound that has low or minimal solubility for the polymer in the ink composition. There exist many methods for determining level of solubility of the polymer in the nonsolvent compound. In some aspects, the non-solvent can be selected by first determining the Hansen solubility parameters can be determined for the polymer and the non-solvent compound. For example, a polymer and non-solvent can be selected so that the Relative Energy Difference calculated form the Hansen solubility parameters of the polymer and the nonsolvent compound can be 1 or greater. As would be appreciated by one of ordinary skill in the art, such an embodiment would provide a non-solvent compound which would be unable to dissolve the polymer.

In some aspects, the non-solvent can correspond to toluene, dimethyl acetamide, or combinations thereof. In some aspects, the non-solvent can be N-methyl-2-pyrrolidone (NMP). In some aspects, the non-solvent can correspond to water and/or can include water. In other aspects, the non-solvent can be substantially free of water (less than 0.1 wt %), which can allow a water-sensitive MOF to be used in the ink composition. HKUST-1 is an example of a water-sensitive MOF. In some aspects, the non-solvent can be an alcohol, such as methanol, ethanol, isopropanol, or n-propanol. It is noted that the evaporation rate for the solvent can be faster than the evaporation rate for the non-solvent under the conditions that will be present after depositing the ink composition, as otherwise the phase inversion to form the polymer structure may not occur.

Additionally or alternately, a pore forming component can be included as a structure forming component. $LiNO_3$ is an example of a pore forming component that can be used in an ink composition. A pore forming component can be added in a relatively low amount, such as in an amount corresponding to 0.1 wt % to 20 wt % of an ink composition, or 0.1 wt % to 10 wt %, or 0.1 wt % to 5.0 wt %, or 1.0 wt % to 20 wt %, or 1.0 wt % to 10 wt %.

Table 1 shows examples of combinations of polymer, solvent, and either non-solvent or pore forming component (i.e., a structure forming component) that can be used to form an ink composition for 3D printing. The final column of Table 1 shows certain solvents which may present difficulties when used in combination with the listed polymer to form an ink composition for 3D printing.

TABLE 1

Polymer, Solvent, and Non-Solvent Combinations

| Polymer | Solvent | Non-Solvent | Solvents which may not be suitable |
|---|---|---|---|
| PIM-1 | THF, $CH_2Cl_2$, $CHCl_3$ | DMAc, DMF, DMSO, water, methanol, ethanol, ethyl acetate, acetonitrile, toluene | NMP (hot) |
| CA | Acetone | Water, Butanol, n-Propanol, isopropanol, ethanol, methanol, acetonitrile, ethyl acetate, toluene | N-Alkylpyridinium halogenides (e.g. N-ethylpyridinium chloride); Oxides of tertiary amines (e.g. trimethylamine-N-oxide, N-methylpiperidine-N-oxide, etc.); DMSO-containing systems; polar aprotic solvents (DMAc, NMP) with LiCl; Pyridine or quinolone-containing systems |
| PES | DMAc, DMF | Isopropyl Myristate; 1,2,4-trichlorobenzene; o-Dichlorobenzene; water; $LiNO_3$ | NMP, DMSO |
| Matrimid | DMAc, DMF, THF, $CH_2Cl_2$, $CHCl_3$ | Water, alcohols, ethyl acetate, toluene, $LiNO_3$ | NMP |

An example of a printer for forming structures using an ink composition can be a direct ink writing printer. For example, in some aspects, the printer can comprise an ink holding container, an ink nozzle configured to attach to the ink holding container, a vapor nozzle, and a moving stage for a substrate. In some aspects, the moving stage can be configured to detachably attach to a substrate. The distance between the ink nozzle and the moving stage can comprise an air gap substantially surrounded by a control volume shell. For instance, the control volume shell can comprise a cylindrical shell with an opening for receiving a vapor nozzle. The control volume shell can comprise any hollow shape to substantially surround the ink nozzle and air gap, including but not limited to, cylindrical, conical, rectangular, frusto-conical, elliptical, or any combination thereof. In some optional aspects, during formation of a layer, additional solvent can be dispensed as a vapor into the control volume shell to assist with managing the amount of evaporation immediately after deposition of a layer of an ink composition.

In some aspects, the bed or surface where the ink composition is deposited to form a 3D structure can correspond to a heated bed or surface. Using a heated bed or surface can assist with evaporation of the solvent in order to trigger the phase inversion that results in the polymeric structure. In some aspects, the bed or surface where an ink composition is deposited for forming a 3D printed structure can be heated to a temperature of 40° C. to 80° C.

Barrier Layers

In various aspects, a barrier layer can be added to the process gas flow channels and/or the heat transfer fluid flow channels. In aspects where adsorbent is distributed throughout the volume of the polymeric structural material, the barrier layer can optionally but preferably be added to the heat transfer flow channels.

Any convenient type of barrier layer can be used. The barrier layer can correspond to a material with a reduced or minimized porosity so that diffusion of heat transfer fluid and/or process gas through the barrier is reduced or minimized Examples of suitable materials for the barrier layers can include, but are not limited to, polyvinylidene chloride (PVDC), latex, polyacrylonitrile, epichlorohydrin, polyether amide block co-polymer, and mixtures and/or co-polymers of the above. It is noted that depending on the structure of the monolith, other barrier layers could also be suitable, such as ceramic, glass, or metal oxide barrier layers.

One of the difficulties with adding a barrier layer to a unitary structure is selectively adding the barrier layer to only desired channels. Conventionally, barrier layers are typically added to monoliths by dip-coating an entire monolith in a solution of the barrier layer. While this can be effective, this would result in applying a barrier layer to both the process gas flow channels and the heat transfer fluid flow channels. In aspects where adsorbent is distributed throughout the volume of a unitary structure that contains process gas flow channels and heat transfer fluid flow channels, it is desirable to have a barrier layer in the heat transfer fluid flow channels while still allowing the process gas flow channels to be substantially free of barrier layer.

One option for selectively adding a barrier layer to the heat transfer fluid flow channels is to selectively flow a solution of a polymer suitable for forming a barrier layer into the heat transfer fluid flow channels. To add the barrier layer, the desired flow channels (such as the heat transfer fluid flow channels) of a unitary structure can first be saturated with water or solvent. A latex solution (or other barrier polymer solution) can then be flowed through the channels, coating the walls. Air or $N_2$ (or more generally, any gas that does not interact with the barrier polymer solution) can then flowed down the channels to minimize or prevent channel blockages from forming. The flow air or $N_2$ can also be beneficial for inducing latex drying. Humid air/$N_2$ can also be used, and may show improvements in channel barrier quality. This process of flowing latex (or another polymer solution), followed by air or $N_2$ is repeated until a desired barrier thickness is achieved. In some aspects, the orientation of the unitary structure can be flipped each time another round of polymer addition is started, to ensure good barrier layer installation at both ends of the unitary structure.

As another example, in aspects where the structural material defining the heat transfer fluid flow channels and the process gas flow channels is a porous material, the nature of the contactors described herein can be used to assist with forming an improved barrier layer in the heat transfer fluid channels. In this type of example, the process can begin by optionally saturating the heat transfer fluid channels with water or solvent. A polymer solution for forming a barrier layer can then be introduced. The barrier polymer solution can be introduced into the contactor using the heat transfer fluid inlet (or inlets) that is in fluid communication with the heat transfer fluid flow channels. This means that the distribution system of the contactor can be used to selectively introduce the polymer solution into the desired (heat transfer fluid) flow channels. During introduction of the barrier polymer solution, the process gas inlet and process gas outlet can be connected to a pump, so that the pressure in the process gas flow channels is reduced relative to the pressure in the heat transfer fluid flow channels. The difference in pressure between the process gas flow channels and the heat transfer fluid flow channels can enhance diffusion of the barrier polymer solution into the bulk structural material that defines the heat transfer fluid flow channels. This can allow a substantially complete barrier layer to be formed in the heat transfer fluid flow channels while reducing or minimizing the loss of channel diameter, as an increased portion of the resulting barrier layer is within the structural material.

The configuration shown in FIG. 1 can be used to illustrate this concept of selective incorporation of a barrier layer into only, for example, the heat transfer fluid channels. In the example configuration shown in FIG. 1, separate headers are providing for managing the flows within the process gas flow channels 130 and the heat transfer fluid flow channels 160. In FIG. 1, the process gas flow channels 130 are incorporated into a flow pathway that includes process gas inlet 132, process gas inlet header 140, process gas flow channels 130, process gas outlet header 145, and process gas outlet 138. Thus, there is fluid communication between all of the elements in this flow pathway. A separate flow pathway is provided for the heat transfer fluid flow channels 160. The flow pathway for fluid communication with the heat transfer fluid flow channels 160 includes heat transfer fluid inlet 162, heat transfer fluid inlet header 170, heat transfer fluid flow channels 160, heat transfer fluid outlet header 175, and heat transfer fluid outlet 168. Because these separate flow pathways are available, a polymer solution can be introduced into a selected flow pathway, such as the flow pathway including heat transfer fluid flow channels 160. Optionally, the other flow pathway (i.e., the flow pathway including process gas flow channels 130) can be exposed to reduced pressure, to further enhance the intrusion of the barrier layer into the pores around the selected flow pathway including heat transfer fluid flow channels 160. In such an example, during introduction of the barrier polymer solution and/or during the subsequent drying/purge step, either heat transfer fluid inlet 162 or heat transfer fluid outlet 168 in fluid can be open to allow for exhaust of excess polymer solution or exhaust of the drying/purge gas. (The open end is distinct from the inlet or outlet where the barrier polymer solution or the drying/purge gas is introduced.) During the introduction of the barrier polymer solution and/or during the drying/purge gas step, the open inlet or outlet for the heat transfer fluid system will typically correspond to the lowest pressure in the heat transfer fluid flow path. In various aspects, the pressure in the process gas flow channels can be reduced so that the pressure in the process gas flow channels (such as process gas flow channels 130) is lower than the open end of the heat transfer fluid system (such as heat transfer fluid inlet 162 or heat transfer fluid outlet 168) by 5.0 kPa or more, or 10 kPa or more, or 20 kPa or more, such as up to roughly 100 kPa.

Flow Channel Configurations

In various aspects, the process gas flow channels and the heat transfer flow channels can be configured to improve or maximize the potential for heat transfer between the channels. One option is to have arrays of flow channels that increase or maximize the overall transfer of heat from the plurality of process gas flow channels to the plurality of heat fluid transfer flow channels. Another option is to have flow channel configurations that increase or maximize the interaction of an individual flow channel with an individual heat transfer flow channel. Still other options can involve a blend of improving interactions between individual flow channels and interactions between arrays of flow channels. Any convenient combination of flow channel arrangements can be used. For example, another option is a three dimensional array of pairs of helically intertwined process gas flow channels and heat transfer fluid flow channels, which can optionally further include an interspersed array of additional linear heat transfer fluid flow channels and/or process gas flow channels. Still another option can be a gyroid structure of independent but intertwined channels.

In the configuration shown in FIG. 1, the process gas flow channels and heat transfer flow channels are represented as being relatively constant in size and substantially parallel between the location of the heat transfer fluid inlet header and heat transfer fluid outlet header. This corresponds to having two interspersed three-dimensional arrays of flow channels. This can potentially provide heat transfer between the heat transfer fluid in multiple heat transfer fluid flow channels with any given process gas flow channel. In this type of configuration, various ratios of process gas flow channels to heat transfer fluid flow channels can be used.

Although FIG. 1 shows linear parallel flow channels, other types of flow channel configurations can be used. For example, the transfer between a pair of flow channels can potentially be increased by using an intertwined helical configuration for a process gas flow channel and a heat transfer fluid flow channel.

Still another option for a flow channel configuration is to allow the size to vary over the length of the channel. The size of a flow channel can be described based on the cross-sectional area of the flow channel. Flow channels of roughly constant cross-sectional area have traditionally been used for contactors. To the degree that flow channel size might be changed, it would be expected conventionally that decreasing the cross-sectional area of downstream portions of the flow channel would be beneficial, in order to compensate for the reduced concentration of the adsorbed component as process gas flows toward the end of the flow channel. However, it has been unexpectedly discovered that improved adsorption can be achieved by increasing the cross-sectional area of the downstream portions of the flow channel.

An increase in cross-sectional area for downstream portions of the flow channel can be achieved in any convenient manner. One option is to have a continuous increase in cross-sectional area along the length of the flow channel, such as having a linear increase in cross-sectional area as the flow channel progresses through the structural material. Another option can be to have one or more step increases in cross-sectional area. Yet another option can be to use a combination of continuous and step increases. Still another option can be to initially maintain flow channel size, and then initiate continuous and/or step increases of cross-sectional area at a downstream location.

Example—Changes in Process Gas Flow Channel Size

Three adsorption contactors were 3D printed to investigate the influence of the mass transfer contactor structure on the kinetic adsorption performance. The three adsorption monolith modules corresponded to a narrow channel monolith, a medium channel monolith, and a wide channel monolith. The wide channel monolith included square process gas flow channels with a width of 333 µm. The medium channel monolith included square process gas flow channels with a width of 115 µm. The narrow channel monolith had channels with a width of 52 µm.

The adsorption contactors were fabricated in a layer-by-layer manner. For each individual contactor, multiple layers of filaments were packed in the z-direction, and each layer consisted of the same number of filaments. Filaments in adjacent layers were deposited in orthogonal directions. To enable a fair comparison of adsorption performance, the three adsorption modules possessed the same overall dimension (0.9 cm×0.9 cm×0.9 cm) and the same material loading (0.27 g of PIM-1). Since the adsorbers were fabricated via the same solution-based additive manufacturing (SBAM) protocol, each filament of the adsorption modules possessed the same porosity (40%) associated with the hierarchical pores throughout the 3D printed adsorbent filaments. The apparent density of the fresh PIM-1 filaments was 0.6 g/mL and the void fraction of each adsorption module was 0.383 as probed by mercury porosimetry. Therefore, in this example, the primary parameter impacting the kinetic adsorption performance was the contactor design.

The adsorption modules were packaged individually in customized stainless-steel cubic tubes. 16-µm aluminum foil was used to seal the gaps between stainless steel house and the structured adsorbent to avoid leaking pathways. Glass wool was packed between adsorption modules to avoid gas composition variation in the radial direction.

Figure 5:
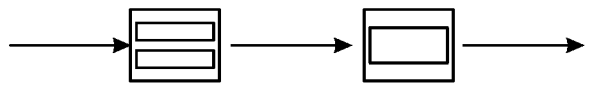
FIG. 5 shows examples of monoliths that include expanding flow channel and contracting flow channel configurations.
Figure 5:
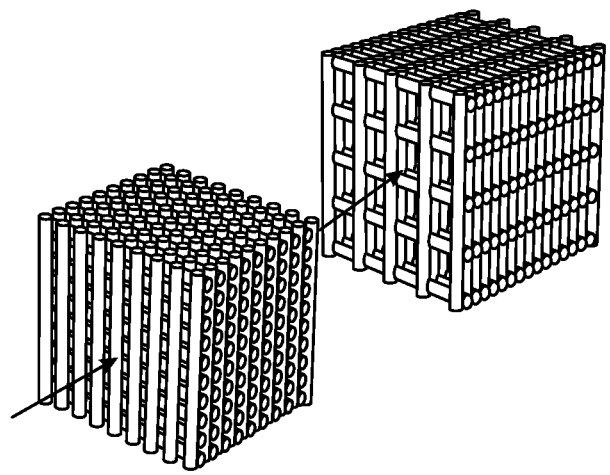
Figure 5:
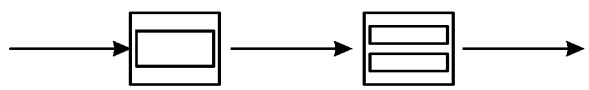
Figure 5:
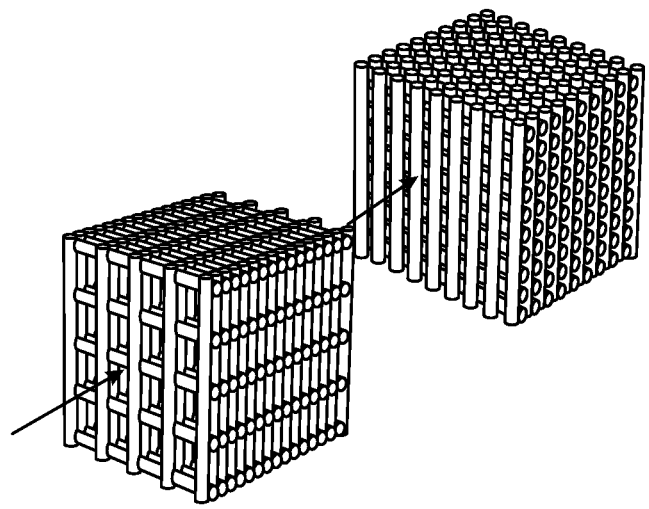

FIG. 5 shows examples of two contactor configurations that were formed using the monolith modules. In a first configuration, the medium channel monolith module and the wide channel monolith module were inserted into a contactor, with the medium channel monolith module as the upstream structure. This is illustrated in the top portion of FIG. 5. For the ease of discussion, this adsorber assembly strategy (shown in the top portion of FIG. 5) is referred to as the "expanding channel", since the fluid channels in medium-channel adsorber are smaller (width 115 µm) than in wide-channel adsorber (width 333 µm). In a second configuration, the same two monolith modules were inserted into a contactor, but with the wide channel monolith module as the upstream structure. This is illustrated in the bottom portion of FIG. 5. This adsorber assembly strategy is referred to as the "shrinking channel".

Figure 6:
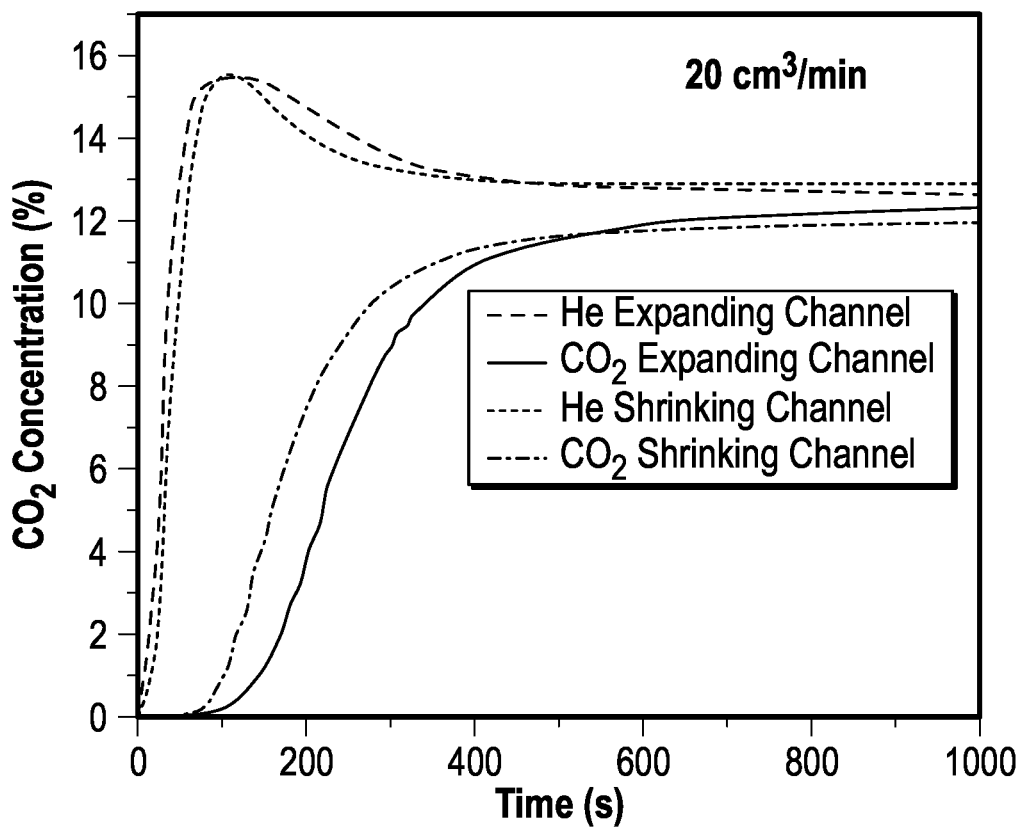
FIG. 6 shows $CO_2$ adsorption breakthrough curves for expanding flow channel and contracting flow channel contactor configurations.

The adsorption properties of the expanding channel and shrinking channel assemblies were tested using a simulated flue gas with a composition of 12.5 vol % $CO_2$, 12.5 vol % He, and 75 vol % $N_2$. The PIM-1 material used to form the monolith modules will adsorb $CO_2$ but not He or $N_2$. After placing the appropriate assembly into a contactor, the simulated flue gas was flowed through the contactor at flow rates of roughly 10 $cm^3$/min, 20 $cm^3$/min, 30 $cm^3$/min, and 40 $cm^3$/min. The composition of the exhaust from the contactor was monitored to determine the $CO_2$ concentration in the contactor exhaust as a function of time. To provide a consistency check, the concentration of He in the flue gas was also monitored. FIG. 6 shows the results from the adsorption testing at an input flow rate of 20 $cm^3$/min. As shown in FIG. 6, the expanding channel assembly provided nearly double the $CO_2$ capacity at 5.0 vol % breakthrough capacity as compared with the $CO_2$ capacity for 5.0 vol % breakthrough for the shrinking channel assembly. This increased breakthrough capacity was also observed at the higher flow rates.

An adsorption contactor assembly with an expanding channel design was also compared with adsorbers based on conventional style packing materials. The expanding channel design used for this comparison was a "triple expanding" configuration that included the narrow module, the medium module, and the wide module. This was compared to a contactor including a packed bed of a PIM-1 based packing material. To exclude the influence of internal mass transfer resistance, a multicomponent PIM-1 solution was printed into random coils via the SBAM method and then cut into 1 cm long fibers. Owing to the identical processing history, the PIM-1 fibers and the PIM-1 adsorption contactor modules possess identical porosities and thus identical internal mass transfer coefficients. The PIM-1 fibers were then impregnated with 25 wt % PEI and packed into the same stainless steel housing.

Figure 7:
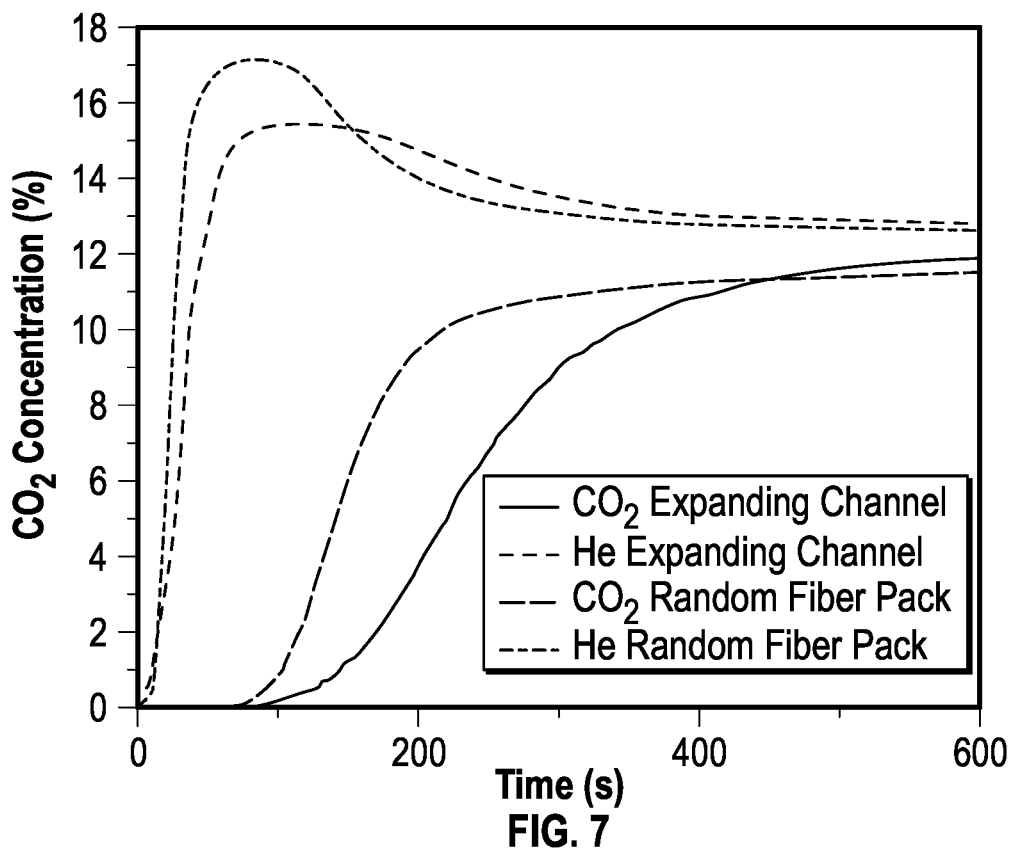
FIG. 7 shows $CO_2$ adsorption breakthrough curves for an expanding flow channel and packed bed contactor configurations.

In a first set of runs, a packed bed contactor including a PEI/PIM-1 packing material was compared with the expanding channel design. The packed bed was formed by randomly packing the PEI/PIM-1 fibers into the bed. The PEI/PIM-1 (0.18 g/0.54 g) packed bed (0.9 cm×0.9 cm×1.8 cm) was tested using the same simulated flue gas at 20 $cm^3$/min. As shown in FIG. 7, the packed bed adsorber and the expanding channel assembly exhibit significantly different $CO_2$ breakthrough curves, even though the two contactors have the same void fraction, the same adsorbent amount, and the same overall dimensions. The packed bed adsorber exhibited a slightly earlier $CO_2$ breakthrough (59 s) and a rapid $CO_2$ concentration increase from 0 to 9.8% in 100 s. As a comparison, the expanding channel assembly exhibited a delayed $CO_2$ breakthrough (77 s) and slower $CO_2$ concentration increase from 0 to 9.8% in 250 seconds. Without being bound by any particular theory, it is believed that the early $CO_2$ breakthrough of the packed bed adsorber was due to bypasses in the loosely packed region in the packed bed. The tortuous fluid distribution channels in the packed bed also resulted in more efficient mass transfer, which leads to a rapid $CO_2$ concentration increase. The packed bed adsorber exhibits a longer and flatter $CO_2$ breakthrough tail than the expanding channel assembly, which indicates less efficient heat removal in the packed bed adsorber. The packed bed adsorber exhibited a 5% breakthrough capacity of 0.43 mmol and a full capacity of 1.08 mmol. As a comparison, the expanding channel assembly exhibits a 33% increase in $CO_2$ capacity for the 5% breakthrough threshold.

Figure 8:
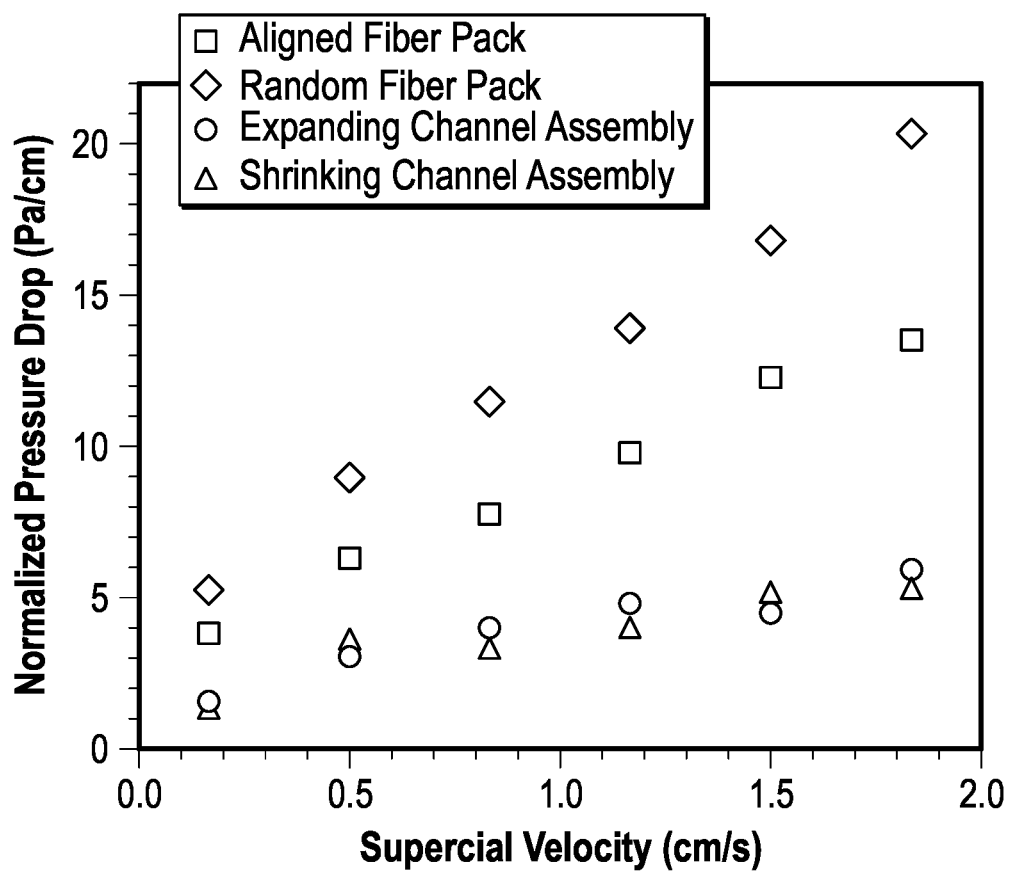
FIG. 8 shows pressure drop within a contactor for various contactor configurations.

Another advantage of the modular adsorption contactors is the low pressure drop. FIG. 8 shows the normalized pressure drop across the modular adsorption contactor assembly and beds of fibers packed in two different manners when exposed to nitrogen with superficial velocities ranging from 0.16 cm/s to 1.83 cm/s. In one type of packed bed, the fibers were packed in a random manner. In another type of packed bed, the bed was formed using aligned fibers. When packed into ultra-short adsorbers (1.8 cm length), packed beds consisting of aligned fibers typically exhibit bypass effects. The adsorber with random fiber packing eliminates the difficulties with fluid bypass, but results in high resistance to fluid. No pressure drop difference was observed between the expanding channel assembly and the shrinking channel assembly, which is in agreement with expectations.

Since the individual adsorption modules are much longer than the diameter of the flow channels, fully developed flow is expected in most of the assembly; as a result, entrance effects due to expansion and contraction should not play a significant role and the order of the modules should therefore not matter with regards to flow resistance.

Additional Embodiments

Embodiment 1. An adsorption module, comprising: a first plurality of process gas flow channels defined by a structural material of a unitary structure, the structural material comprising at least one adsorbent component; a second plurality of heat transfer fluid flow channels defined by the structural material of the unitary structure; one or more process gas inlet headers in fluid communication with the process gas flow channels; one or more heat transfer fluid inlet headers in fluid communication with the heat transfer fluid flow channels, at least one of the one or more process gas inlet headers and the one or more heat transfer fluid inlet headers being defined by the structural material of the unitary structure; and at least one outlet header in fluid communication with the process gas flow channels or the heat transfer fluid channels.

Embodiment 2. The adsorption module of Embodiment 1, wherein an average axis of flow for the process gas flow channels differs from an average axis of flow for the heat transfer fluid flow channels by 30° or less within a central volume in the unitary structure.

Embodiment 3. The adsorption module of any of the above embodiments, wherein a first portion of the process gas flow channels has an average cross-sectional area that is smaller than a cross-sectional area of a second portion of the process gas flow channels, the second portion of the process gas flow channels being downstream from the first portion of the process gas flow channels, the average cross-sectional area of the process gas flow channels optionally being continuously increasing for at least a portion of the process gas flow channels.

Embodiment 4. The adsorption module of any of the above embodiments, wherein the unitary structure comprises a contactor, the adsorption module comprising: a process gas outlet header in fluid communication with the process gas flow channels, the process gas outlet header being defined by the structural material of the unitary structure; and a heat transfer fluid outlet header in fluid communication with the heat transfer flow channels, the heat transfer fluid outlet header being defined by the structural material of the unitary structure.

Embodiment 5. The adsorption module of Embodiment 4, i) wherein the adsorption module comprises a secondary inlet header defined by the structural material of the unitary structure, the heat transfer fluid inlet header providing fluid communication between the secondary inlet header and the heat transfer fluid flow channels; ii) wherein the adsorption module comprises an additional inlet header defined by the structural material of the unitary structure, the process gas inlet header providing fluid communication between the additional inlet header and the process gas flow channels; or iii) a combination of i) and ii).

Embodiment 6. The adsorption module of any of the above embodiments, wherein the unitary structure comprises a monolith, the adsorption module further comprising a plurality of outer shell pieces, the monolith being at least partially contained within the plurality of outer shell pieces.

Embodiment 7. The adsorption module of Embodiment 6, a) wherein the adsorption module comprises a secondary inlet header comprising a volume between the monolith and at least one of the plurality of outer shell pieces, the heat transfer fluid inlet header providing fluid communication between the secondary inlet header and the heat transfer fluid flow channels; b) wherein the adsorption module comprises an additional inlet header comprising a volume between the monolith and at least one of the plurality of outer shell pieces, the heat transfer fluid inlet header providing fluid communication between the additional inlet header and the process gas flow channels; or c) a combination of a) and b).

Embodiment 8. The adsorption module of any of the above embodiments, wherein the structural material comprises a composite of a polymeric material and the at least one adsorbent component, the at least one adsorbent component of the structural material optionally comprises a metal organic framework material, a material comprising a zeotype framework structure, a polymeric material, or a combination thereof.

Embodiment 9. The adsorption module of any of the above embodiments, wherein the structural material comprises cellulose acetate, polyvinylpyrrolidone, polyether sulfone, polysulfone, epichlorohydrin, a polyether amide block co-polymer, polyimides, polyolefins, polypropylene, polyethylene, polyamides, poly(tetrafluoroethene), polyvinylidene chloride (PVDC), polystyrene, polyisobutylene, polybutadiene, polyurethanes, elastomers, co-polymers thereof, a polymer of intrinsic porosity, or combinations thereof.

Embodiment 10. The adsorption module of any of the above embodiments, wherein the heat transfer fluid inlet header and the heat transfer fluid flow channels further comprise a barrier layer.

Embodiment 11. The adsorption module of any of the above embodiments, wherein the at least one adsorbent component comprises at least one adsorbent for $CO_2$.

Embodiment 12. A method for forming a barrier layer inside flow channels of an adsorption contactor, comprising: providing an adsorption module according to any of Embodiments 1-11; passing a solution comprising a polymer barrier component into the heat transfer fluid flow channels; flowing a purge stream through the heat transfer fluid flow channels to form a barrier layer at surfaces of the heat transfer fluid flow channels; and lowering a pressure in the process gas flow channels, during at least one of the passing of the solution into the heat transfer fluid flow channels and the flowing of the purge stream through the heat transfer fluid flow channels, to a pressure at least 5 kPa-a below an average pressure associated with the heat transfer fluid channels during the flowing of the purge stream.

Embodiment 13. The method of Embodiment 12, further comprising repeating the passing a solution, the flowing the purge stream, and the lowering the pressure a plurality of times.

Embodiment 14. An adsorption module, comprising: a monolith comprising a first plurality of process gas flow channels and a second plurality of heat transfer fluid flow channels; an outer shell comprising a first outer shell piece and a second outer shell piece, the first outer shell piece being a unitary structure comprising a polymeric structural material, the first outer shell piece comprising a process gas inlet header, the monolith at least partially residing within a volume defined by the first outer shell piece and the second outer shell piece, the first plurality of process gas flow channels being in fluid communication with the process gas inlet header; and at least one outlet header in fluid communication with the process gas flow channels or the heat transfer fluid channels.

Embodiment 15. The adsorption module of Embodiment 14, wherein the monolith comprises a ceramic monolith, a metallic monolith, or a combination thereof, the monolith optionally comprising an adsorbent coated on the monolith.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. An adsorption module, comprising:
   a first plurality of process gas flow channels defined by a structural material of a unitary structure, the structural material comprising at least one adsorbent component;
   a second plurality of heat transfer fluid flow channels defined by the structural material of the unitary structure;
   one or more process gas inlet headers in fluid communication with the process gas flow channels;
   one or more heat transfer fluid inlet headers in fluid communication with the heat transfer fluid flow channels, at least one of the one or more process gas inlet headers and the one or more heat transfer fluid inlet headers being defined by the structural material of the unitary structure; and
   at least one outlet header in fluid communication with the process gas flow channels or the heat transfer fluid flow channels.

2. The adsorption module of claim 1, wherein an average axis of flow for the process gas flow channels differs from an average axis of flow for the heat transfer fluid flow channels by 30° or less within a central volume in the unitary structure.

3. The adsorption module of claim 1, wherein a first portion of the process gas flow channels has an average cross-sectional area that is smaller than a cross-sectional area of a second portion of the process gas flow channels, the second portion of the process gas flow channels being downstream from the first portion of the process gas flow channels.

4. The adsorption module of claim 3, wherein the average cross-sectional area of the process gas flow channels is continuously increasing, or wherein the average cross-sectional area of the second portion of the process gas flow channels is continuously increasing.

5. The adsorption module of claim 1, wherein the unitary structure comprises a contactor, the adsorption module comprising:
   a process gas outlet header in fluid communication with the process gas flow channels, the process gas outlet header being defined by the structural material of the unitary structure; and
   a heat transfer fluid outlet header in fluid communication with the heat transfer fluid flow channels, the heat transfer fluid outlet header being defined by the structural material of the unitary structure.

6. The adsorption module of claim 5, wherein the adsorption module comprises a secondary inlet header defined by the structural material of the unitary structure, the one or more heat transfer fluid inlet headers providing fluid communication between the secondary inlet header and the heat transfer fluid flow channels.

7. The adsorption module of claim 5, wherein the adsorption module comprises an additional inlet header defined by the structural material of the unitary structure, the one or more process gas inlet headers providing fluid communication between the additional inlet header and the process gas flow channels.

8. The adsorption module of claim 1, wherein the unitary structure comprises a monolith, the adsorption module further comprising a plurality of outer shell pieces, the monolith being at least partially contained within the plurality of outer shell pieces.

9. The adsorption module of claim 8, wherein the adsorption module comprises a secondary inlet header comprising a volume between the monolith and at least one of the plurality of outer shell pieces, the one or more heat transfer fluid inlet headers providing fluid communication between the secondary inlet header and the heat transfer fluid flow channels.

10. The adsorption module of claim 8, wherein the adsorption module comprises an additional inlet header comprising a volume between the monolith and at least one of the plurality of outer shell pieces, the one or more heat transfer fluid inlet headers providing fluid communication between the additional inlet header and the process gas flow channels.

11. The adsorption module of claim 1, wherein the structural material comprises a composite of a polymeric material and the at least one adsorbent component.

12. The adsorption module of claim 1, wherein the at least one adsorbent component of the structural material comprises a polymeric material, a material comprising a zeotype framework structure, or a combination thereof.

13. The adsorption module of claim 1, wherein the structural material comprises cellulose acetate, polyvinylpyrrolidone, polyether sulfone, polysulfone, epichlorohydrin, a polyether amide block co-polymer, polyimides, polyolefins, polypropylene, polyethylene, polyamides, poly (tetrafluoroethene), polyvinylidene chloride (PVDC), polystyrene, polyisobutylene, polybutadiene, polyurethanes, elastomers, co-polymers thereof, or combinations thereof.

14. The adsorption module of claim 1, wherein the structural material comprises a material of intrinsic porosity.

15. The adsorption module of claim 1, wherein the at least one adsorbent component comprises a metal organic framework material.

16. The adsorption module of claim 1, wherein the one or more heat transfer fluid inlet headers and the heat transfer fluid flow channels further comprise a barrier layer.

17. The adsorption module of claim 1, wherein the at least one adsorbent component comprises at least one adsorbent for $CO_2$.

18. An adsorption module, comprising:
a monolith comprising a first plurality of process gas flow channels and a second plurality of heat transfer fluid flow channels;
an outer shell comprising a first outer shell piece and a second outer shell piece, the first outer shell piece being a unitary structure comprising a polymeric structural material, the first outer shell piece comprising a process gas inlet header, the monolith at least partially residing within a volume defined by the first outer shell piece and the second outer shell piece, the first plurality of process gas flow channels being in fluid communication with the process gas inlet header; and
at least one outlet header in fluid communication with the process gas flow channels or the heat transfer fluid flow channels.

19. The adsorption module of claim 18, wherein the monolith comprises a ceramic monolith, a metallic monolith, or a combination thereof.

20. The adsorption module of claim 18, wherein the monolith comprises an adsorbent coated on the monolith.

* * * * *